(12) United States Patent
Wang et al.

(10) Patent No.: US 11,982,214 B2
(45) Date of Patent: May 14, 2024

(54) POWERTRAIN, VEHICLE, AND MOTOR COOLING METHOD

(71) Applicant: Huawei Digital Power Technologies Co., Ltd., Shenzhen (CN)

(72) Inventors: Jiangang Wang, Dongguan (CN); Chaoqiang Wu, Shenzhen (CN); Hongbing Liu, Shanghai (CN); Jun Chen, Dongguan (CN); Hu Zhong, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/323,259

(22) Filed: May 24, 2023

(65) Prior Publication Data

US 2023/0296038 A1 Sep. 21, 2023

Related U.S. Application Data

(63) Continuation of application No. PCT/CN2020/138603, filed on Dec. 23, 2020.

(51) Int. Cl.
| | |
|---|---|
| *F01M 1/16* | (2006.01) |
| *F01M 1/02* | (2006.01) |
| *F01M 11/00* | (2006.01) |
| *F16D 57/06* | (2006.01) |

(52) U.S. Cl.
CPC ............. *F01M 1/16* (2013.01); *F01M 1/02* (2013.01); *F01M 11/0004* (2013.01); *F16D 57/06* (2013.01)

(58) Field of Classification Search
CPC .......... F01M 1/02; F01M 1/16; F01M 11/0004
USPC .......................................................... 184/14
See application file for complete search history.

(56) References Cited

U.S. PATENT DOCUMENTS

| | | | | |
|---|---|---|---|---|
| 5,816,212 | A * | 10/1998 | Lindquist | F16N 7/40 210/167.04 |
| 6,336,880 | B1 * | 1/2002 | Agner | F16H 61/66263 474/18 |
| 6,953,327 | B1 * | 10/2005 | Hauser | F04B 23/06 91/499 |
| 9,322,466 | B2 * | 4/2016 | Ebner | F16H 57/05 |
| 10,197,316 | B2 * | 2/2019 | De Larminat | F25B 43/02 |
| 10,941,967 | B2 * | 3/2021 | De Larminat | F01K 25/08 |
| 2002/0060099 | A1 * | 5/2002 | Takenaka | B60K 6/383 903/952 |
| 2006/0065217 | A1 * | 3/2006 | Ikegawa | F01M 1/02 123/196 R |

(Continued)

*Primary Examiner* — Henry Y Liu
(74) *Attorney, Agent, or Firm* — Leydig, Voit & Mayer, Ltd.

(57) ABSTRACT

An oil inlet of a motor communicates with a first end of an oil pump through a first passage. A first oil sump of the motor communicates with a second end of the oil pump through a second passage. When the oil pump is rotating, a port at the first end is an oil outlet of the oil pump, and a port at the second end is an oil inlet of the oil pump. The first end of the oil pump communicates with a second oil sump through a third passage with a first valve. The second end of the oil pump communicates with the second oil sump through a fourth passage with a second valve. In this way, when the oil pump is reversing, coolant may be input into a motor cavity and accumulate in the motor cavity, so as to cool motor components in an immersion manner.

20 Claims, 17 Drawing Sheets

(56) References Cited

U.S. PATENT DOCUMENTS

| | | | | |
|---|---|---|---|---|
| 2008/0017472 A1* | 1/2008 | Redelman | ............... | F16H 57/04 |
| | | | | 192/221 |
| 2010/0107603 A1* | 5/2010 | Smith | ..................... | F02C 7/224 |
| | | | | 701/100 |
| 2014/0094333 A1* | 4/2014 | Ebner | .................... | F16H 57/05 |
| | | | | 474/91 |
| 2014/0241909 A1* | 8/2014 | Perevozchikov | ..... | F04C 23/001 |
| | | | | 417/244 |
| 2015/0053505 A1* | 2/2015 | Klowak | ............... | F01M 11/061 |
| | | | | 184/105.1 |
| 2016/0003510 A1* | 1/2016 | De Larminat | .......... | F25B 43/02 |
| | | | | 62/470 |
| 2019/0162457 A1* | 5/2019 | De Larminat | .......... | F04D 17/12 |
| 2020/0114848 A1* | 4/2020 | Parrish | ..................... | F01M 1/10 |
| 2020/0392877 A1* | 12/2020 | Hori | .................... | F16H 57/0435 |

* cited by examiner

POWERTRAIN, VEHICLE, AND MOTOR COOLING METHOD

CROSS-REFERENCE TO RELATED APPLICATIONS

This disclosure is a continuation of International Application No. PCT/CN2020/138603, filed on Dec. 23, 2020, the disclosure of which is hereby incorporated by reference in its entirety.

TECHNICAL FIELD

This disclosure relates to the vehicle power field, and in particular, to a powertrain, a vehicle, and a motor cooling method.

BACKGROUND

Nowadays, as electric vehicles are increasing in popularity, one significant performance indicator of the electric vehicles is the powertrain. The development of electric vehicles gradually increases the need of miniaturization of the powertrain, thereby increasing power density accordingly. As the power density increases, a larger amount of heat is generated by a running powertrain. Therefore, increasing heat dissipation efficiency of the powertrain is a technical problem to be resolved urgently.

At present, motors in some powertrains gradually use oil cooling for heat dissipation. Specifically, a coolant channel for heat dissipation is disposed inside a rotating shaft of a rotor iron core of the motor. Then, coolant accumulating in a housing is lifted by rotating a gear, and is introduced into the coolant channel inside the rotating shaft. The coolant flows in the coolant channel with the rotation of the rotor iron core. Finally, due to the centrifugal function of the rotation of the rotor iron core, the coolant is sprayed out from the coolant channel to achieve the purpose of heat dissipation. However, when the motor stops or runs at a low speed, it is difficult for the gear to lift the coolant, and therefore it is impossible to effectively dissipate heat for motor components (such as a rotor iron core).

In conclusion, a solution is urgently needed to improve a heat dissipation effect for the motor.

SUMMARY

This disclosure provides a powertrain, a vehicle, and a motor cooling method, to improve a heat dissipation effect for a motor.

According to a first aspect, a powertrain is provided, including a motor and an oil pump. The motor is provided with an oil inlet, and the oil inlet of the motor communicates with a first end of the oil pump through a first passage. When the oil pump is rotating, a port at the first end is an oil outlet of the oil pump. When the oil pump is reversing, the port at the first end is an oil inlet of the oil pump. The motor is provided with a first oil sump. The first oil sump communicates with a second end of the oil pump through a second passage. When the oil pump is rotating, a port at the second end is an oil inlet of the oil pump. When the oil pump is reversing, the port at the second end is an oil outlet of the oil pump. The first end of the oil pump communicates with a second oil sump through a third passage with a first valve. The second end of the oil pump communicates with the second oil sump through a fourth passage with a second valve. In this way, when the oil pump is reversing, coolant may be input into a motor cavity and accumulate in the motor cavity, so as to cool motor components in an immersion manner, thereby improving a cooling effect.

In an embodiment, when the oil pump is rotating, the second valve is in an open state and the first valve is in a closed state. In this way, when the oil pump is rotating, the second end of the oil pump is an oil inlet end. In this case, the first valve on the third passage is in a closed state or the third passage is closed, whereas the second valve on the fourth passage is in an open state or the fourth passage is open. In this case, as the oil pump rotates, coolant flows into the oil pump from the second oil sump through the fourth passage, and at the same time coolant also flows into the oil pump from the first oil sump. The first end of the oil pump is an oil outlet end. After flowing out of the oil outlet end of the oil pump, the coolant flows into a heat exchanger, and then into the motor and a retarder for cooling components in the motor and the retarder.

In an embodiment, when the oil pump is reversing, the second valve is in a closed state, and the first valve is in an open state. When the oil pump is reversing, the second end of the oil pump is an oil outlet end and the first end of the oil pump is an oil inlet end. In this case, the first valve on the third passage is in an open state or the third passage is open, whereas the second valve on the fourth passage is in a closed state or the fourth passage is closed. In this case, as the oil pump reverses, the coolant of the second oil sump flows into the oil pump through the third passage. Because the second end of the oil pump is switched to an oil outlet end, the fourth passage connected to the second end of the oil pump is in a closed state, and the second passage connected to the second end of the oil pump is in an open state, as the oil pump reverses, the coolant in the oil pump is input into the motor through the second passage and accumulates in the motor cavity. When motor components (such as a rotor iron core) of the motor are immersed by the coolant in the motor cavity, the motor components (such as a rotor iron core) can be cooled more effectively.

In an embodiment, the second oil sump includes a first opening and a second opening. The second oil sump is connected to the fourth passage through the first opening, and the second oil sump is connected to the third passage through the second opening. A bottom of the first opening is higher than a bottom of the second opening. In other words, the bottom of the second opening is lower. Because the second opening is connected to the third passage, when the oil pump is reversing, more coolant in the second oil sump may be sucked, or it may be understood that when the oil pump is reversing, almost all coolant in the retarder is sucked into the motor cavity, so that more coolant can be input into the motor cavity to immerse and cool the motor components (such as a rotor iron core). Therefore, the bottom of the second opening can be as low as possible. In an embodiment, alternatively, the second opening may be provided at the bottom of a retarder cavity, or at the bottom of the second oil sump, and the first opening may be provided on a side of the retarder. A bottom of the first opening is higher, and the first opening is connected to the fourth passage. Therefore, it may be understood that, when the oil pump is rotating, an amount of oil stored in the motor is as small as possible, to reduce a friction loss caused by the stored oil and the rotating motor.

In an embodiment, a retarder is further included. The retarder is provided with an oil inlet. The oil inlet of the retarder communicates with the first end of the oil pump through a fifth passage. The second oil sump is an oil sump disposed on the retarder. In addition to being the oil sump of the retarder, the second oil sump may be another oil sump, for example, an oil sump in another component of the vehicle, or an oil sump that is separately disposed. When the second oil sump is the oil sump of the retarder, the second oil sump can be better compatible with a structure of an existing vehicle, thereby improving the possibility of applying the solution.

In an embodiment, one end of the second passage is connected to the first oil sump. The other end of the second passage communicates with the second end of the oil pump. In this way, it can be seen that the outlet of the oil sump of the motor directly communicates with the oil pump. It may be understood that a second pipe is connected to the outlet of the oil sump of the motor, and the second pipe crosses the second oil sump of the retarder and communicates with the second end of the oil pump.

In an embodiment, a first controller is further included. The first controller is connected to the oil pump. The first controller is configured to control the rotation or reversion of the oil pump.

In an embodiment, the first controller is specifically configured to control the oil pump to reverse when a first condition is met. In an embodiment, the first controller is specifically configured to control the oil pump to rotate when a second condition is met. In an embodiment, the first condition includes at least one of the following: a temperature of the motor is greater than a first temperature threshold; a running time of the motor is greater than a first running time threshold; a running time of the oil pump is greater than a second running time threshold; a temperature of a battery pack is less than a first battery pack temperature threshold; a rotational speed of the motor is less than a first rotational speed threshold; an amount of coolant accumulating in the motor cavity is less than a first coolant capacity threshold; or a height difference between a horizontal plane of coolant in the first oil sump and a horizontal plane of coolant in the second oil sump is not greater than a first height difference threshold. In an embodiment, the second condition includes at least one of the following: a temperature of the motor is not greater than a second temperature threshold; a running time of the motor is not greater than a third running time threshold; a running time of the oil pump is not greater than a fourth running time threshold; a temperature of a battery pack is not less than a second battery pack temperature threshold; a rotational speed of the motor is not less than a second rotational speed threshold; an amount of coolant accumulating in the motor cavity is not less than a second coolant capacity threshold; a decrease amount of a current of the oil pump in second preset duration is greater than a current threshold; a change in a rotational speed of the oil pump in first preset duration is less than a rotational speed change threshold, and a decrease amount of a current of the oil pump in second preset duration is greater than a current threshold; or a height difference between a horizontal plane of coolant in the first oil sump and a horizontal plane of coolant in the second oil sump is greater than a second height difference threshold. In this way, flexibility of the solution can be improved.

In an embodiment, a sensor assembly is further included. The sensor assembly is disposed on an inner wall of the motor cavity, and is configured to detect the amount of coolant accumulating in the motor cavity. Therefore, in an embodiment, the rotation and reversion operations of the oil pump may be controlled in combination with the amount of coolant accumulating in the motor cavity.

In an embodiment, the first controller is specifically configured to: when a first condition is met, periodically perform the following: rotating the oil pump for third preset duration, and reversing the oil pump for fourth preset duration. The motor components (such as a rotor iron core) may be cooled, and heat of the motor may also be taken away by the coolant, and then transferred to the battery pack to heat the battery pack. Moreover, the solution of periodically rotating and reversing the oil pump is relatively simple and easy to implement.

In an embodiment, a third controller is further included, and the third controller is connected to the motor. The third controller is configured to start a derating protection operation for the motor when the temperature of the motor is greater than a third temperature threshold in a case in which the oil pump is reversing. In this way, an excessively high temperature of the motor can be avoided to protect the motor from damage.

In an embodiment, the first valve is a one-way valve, and the second valve is a one-way valve.

In an embodiment, when the oil pump is rotating, the coolant flows into the motor cavity from the first end of the oil pump, and the coolant collected in the first oil sump of the motor flows into the oil pump from the second end of the oil pump through the second passage. When the oil pump is reversing, the coolant flows into the oil pump from the second oil sump through the first end, into the motor cavity through the second end, and accumulates in the motor cavity.

In an embodiment, a battery pack is further included. When the oil pump is rotating, the coolant flows into the oil pump from the motor, and into an oil-water heat exchanger through the first end of the oil pump, so as to transfer the heat generated by the motor to the battery pack through the oil-water heat exchanger.

In an embodiment, a second controller is further included. The second controller is configured to: start to stall the motor, or rotate the motor at a speed less than a third rotational speed threshold when the temperature of the battery pack is less than a preset third battery pack temperature threshold and the battery pack needs to be charged or discharged. Further, in this case, the oil pump may rotate first to bring the heat generated by the motor to the battery pack. After the motor runs for a period of time, the rotation and reversion operations of the oil pump may be controlled based on a specific control policy.

In an embodiment, a second controller is further included. The second controller is configured to supply a direct current to the motor when the temperature of the battery pack is less than a preset third battery pack temperature threshold and the battery pack needs to be charged or discharged. In this way, the motor can generate more heat. In an embodiment, a second controller is further included. The second controller is configured to supply an alternating current to the motor when the temperature of the battery pack is less than a preset third battery pack temperature threshold and the battery pack needs to be charged or discharged. In this way, the motor can generate more heat.

According to a second aspect, a powertrain is provided, including a motor, an oil pump, and a first control member. The motor is provided with an oil inlet, and the oil inlet of the motor communicates with a first end of the oil pump through a first passage. When the oil pump is rotating, a port at the first end is an oil outlet of the oil pump. The motor is provided with a first oil sump. The first oil sump communicates with a second end of the oil pump through a second passage with a first switch. When the oil pump is rotating, a port at the second end is an oil inlet of the oil pump. The first control member is connected to the first switch. The first control member is configured to control an on/off operation of the first switch. The second end of the oil pump communicates with a second oil sump through a fourth passage. In this way, when the first switch is closed, coolant may be input into a motor cavity and accumulate in the motor cavity, so as to cool motor components in an immersion manner, thereby improving a cooling effect.

In an embodiment, when the first switch is in an open state and the oil pump is rotating, coolant flows into the motor cavity from the first end of the oil pump, and coolant collected in the first oil sump of the motor flows into the oil pump from the second end of the oil pump through the second passage. When the first switch is in a non-open state and the oil pump is rotating, coolant flows into the motor cavity from the first end of the oil pump, and accumulates in the motor cavity. In this way, components in the motor cavity can be cooled in an immersion manner.

In an embodiment, when the first switch is in a closed state, the motor cavity is a semi-closed cavity, and an opening area of the motor cavity is an oil inlet of the motor. Therefore, when the first switch is closed, the coolant may flow into the motor through the opening area, and the coolant accumulates in the motor cavity.

In an embodiment, a retarder is further included. The retarder is provided with an oil inlet. The oil inlet of the retarder communicates with the first end of the oil pump through a fifth passage. The second oil sump is an oil sump disposed on the retarder. In addition to being the oil sump of the retarder, the second oil sump may be another oil sump, for example, an oil sump in another component of the vehicle. When the second oil sump is the oil sump of the retarder, the second oil sump can be better compatible with a structure of an existing vehicle, thereby improving the possibility of applying the solution.

In an embodiment, one end of the second passage is connected to the first oil sump. The other end of the second passage is connected to the second oil sump. In this way, it may be understood that a first switch is disposed between the oil sump of the motor and the oil sump of the retarder. When the first switch is in an open state, the oil sump of the motor and the oil sump of the retarder may communicate with each other. When the first switch is in a closed state, the passage between the oil sump of the motor and the oil sump of the retarder is closed so that coolant can accumulate in the motor cavity.

In an embodiment, one end of the second passage is connected to the first oil sump. The other end of the second passage communicates with the second end of the oil pump, and the other end of the second passage is not connected to the second oil sump. In this structural form, it may be understood that the oil sump of the motor is connected to the oil pump side without use of the oil sump of the retarder as an intermediate carrier. In this way, flexibility of the solution can be improved.

In an embodiment, the first switch is a one-way valve.

In an embodiment, the first control member is a third controller, and the third controller is specifically configured to: control the first switch to be in a non-open state when a first condition is met, and control the first switch to be in an open state when a second condition is met. In this way, when the first switch is in an open state, heat of the powertrain may be transferred to the battery pack for heating the battery pack; and the motor components may also be immersed and cooled in an immersion manner by turning off the first switch.

In an embodiment, a sensor assembly is further included. The sensor assembly is disposed on an inner wall of the motor cavity, and is configured to detect the amount of coolant accumulating in the motor cavity. Therefore, in an embodiment, the rotation and reversion operations of the oil pump may be controlled in combination with the amount of coolant accumulating in the motor cavity.

In an embodiment, the first control member is a third controller, and the third controller is specifically configured to: when a first condition is met, periodically perform the following: keeping the first switch open for fifth preset duration, and keeping the first switch closed for sixth preset duration. The motor components (such as a rotor iron core) may be cooled, and heat of the motor may also be taken away by the coolant, and then transferred to the battery pack to heat the battery pack. Moreover, the solution of periodically turning on and off the first switch is relatively simple and easy to implement.

In an embodiment, the first control member is connected to the retarder. The first control member controls an on/off operation of the first switch based on a rotational speed of the retarder. Therefore, on/off of the first switch may be controlled by using a mechanical structure.

In an embodiment, an opening degree of the first switch is related to a rotational speed of the retarder.

In an embodiment, at least one of the following is further included: The first switch is in an open state when a rotational speed of a gear of the retarder is not less than a fourth rotational speed threshold. A lower rotational speed of the gear of the retarder leads to a larger opening of the first switch when the rotational speed of the gear of the retarder is less than the fourth rotational speed threshold. In this case, it may be referred to as that the retarder is in a non-open and non-closed state. The first switch is in a closed state when the rotational speed of the gear of the retarder is less than a fifth rotational speed threshold. The fifth rotational speed threshold is less than the fourth rotational speed threshold.

In an embodiment, a third controller is further included, and the third controller is connected to the motor. The third controller is configured to: start a derating protection operation for the motor when the temperature of the motor is greater than a third temperature threshold in a case in which the first switch is in a non-open state. In this way, an excessively high temperature of the motor can be avoided to protect the motor from damage.

In an embodiment, a second controller is further included. The second controller is configured to: start to stall the motor, or rotate the motor at a speed less than a third rotational speed threshold when the temperature of the battery pack is less than a preset third battery pack temperature threshold and the battery pack needs to be charged or discharged. Further, in this case, the first switch may be turned on first to bring heat generated by the motor to the battery pack. After the motor runs for a period of time, the on/off operation of the first switch may be controlled based on a specific control policy, for example, the first condition and the second condition, or the first switch may be periodically turned on and off.

In an embodiment, a second controller is further included, and the second controller is configured to:
   supply a direct current to the motor when the temperature of the battery pack is less than a preset third battery pack temperature threshold and the battery pack needs to be charged or discharged. In this way, the motor can generate more heat. In an embodiment, a second controller is further included. The second controller is configured to supply an alternating current to the motor when the temperature of the battery pack is less than a preset third battery pack temperature threshold and the battery pack needs to be charged or discharged. In this way, the motor can generate more heat.

In an embodiment, when the first switch is in a non-open state, a height difference between a horizontal plane of coolant in the motor cavity and a horizontal plane of coolant in the retarder is greater than a third height difference threshold. When the first switch is in an open state, a height difference between a horizontal plane of coolant in the motor cavity and a horizontal plane of coolant in the retarder is not greater than a fourth height difference threshold.

In an embodiment, when the first switch is in an open state and the oil pump is rotating, the coolant flows into the oil pump from the motor, and into an oil-water heat exchanger through the first end of the oil pump, so as to transfer the heat generated by the motor to the battery pack through the oil-water heat exchanger.

According to a third aspect, this disclosure further provides a vehicle. The vehicle includes the powertrain in any one of the foregoing technical solutions, and the powertrain is connected to wheels of the vehicle in a transmission manner by using a transmission device, so as to drive the vehicle to travel.

According to a fourth aspect, this disclosure provides a motor cooling method. The method is applied to the powertrain in any one of the first aspect or the possible implementations of the first aspect. The method for cooling the motor of the powertrain includes: when the oil pump is reversing, the coolant flows into the oil pump from the second oil sump through the third passage, and flows into the motor cavity from the oil pump through the second passage, so that the coolant accumulates in the motor cavity to immerse components in the motor cavity. When the oil pump is rotating, the coolant flows into the oil pump from the first oil sump of the motor through the second passage; the coolant flows into the oil pump from the second oil sump through the fourth passage; after flowing out of the oil pump, the coolant drops to a surface of a component in the motor cavity through the first passage, and flows into the first oil sump. In this way, when the oil pump is reversing, the coolant may be input into the motor cavity and accumulate in the motor cavity, so as to cool motor components in an immersion manner, thereby improving a cooling effect.

In an embodiment, the oil pump is controlled to reverse when a first condition is met; and the oil pump is controlled to rotate when a second condition is met. For the first condition and the second condition, refer to the foregoing descriptions. Details are not described herein again. In another embodiment, when a first condition is met, the following is periodically performed: rotating the oil pump for third preset duration, and reversing the oil pump for fourth preset duration.

According to a fifth aspect, this disclosure provides a motor cooling method. The method is applied to the powertrain in any one of the second aspect or the possible implementations of the second aspect. When the first switch is in a closed state, the coolant flows into the oil pump from the second oil sump through the fourth passage, flows out of the oil pump through the first passage, drops to a surface of a component in the motor cavity, then flows into the first oil sump, and accumulates in the motor cavity to immerse the component in the motor cavity. When the first switch is in an open state, the coolant flows into the oil pump from the first oil sump of the motor through the second passage; the coolant flows into the oil pump from the second oil sump through the fourth passage; after flowing out of the oil pump, the coolant drops to a surface of a component in the motor cavity through the first passage, and flows into the first oil sump. In this way, when the first switch is closed, the coolant may be input into the motor cavity and accumulate in the motor cavity, so as to cool motor components in an immersion manner, thereby improving a cooling effect.

In an embodiment, the first switch is controlled to be in a closed state when a first condition is met, and the first switch is controlled to be in an open state when a second condition is met. In an embodiment, when a first condition is met, the following is periodically performed: keeping the first switch open for fifth preset duration, and keeping the first switch closed for sixth preset duration.

In an embodiment, an on/off operation of the first switch is controlled based on a rotational speed of the retarder. In an embodiment, the controlling an on/off operation of the first switch based on a rotational speed of the retarder includes at least one of the following:

the first switch is in an open state when a rotational speed of a gear of the retarder is not less than a fourth rotational speed threshold;

a lower rotational speed of the gear of the retarder leads to a larger opening of the first switch when the rotational speed of the gear of the retarder is less than the fourth rotational speed threshold; or the first switch is in a closed state when the rotational speed of the gear of the retarder is less than a fifth rotational speed threshold, where the fifth rotational speed threshold is less than the fourth rotational speed threshold.

According to a sixth aspect, an apparatus is provided. The apparatus includes modules configured to perform any one of the fourth aspect or the possible implementations of the fourth aspect. Alternatively, the apparatus includes modules configured to perform any one of the fifth aspect or the possible implementations of the fifth aspect.

According to a seventh aspect, an apparatus is provided. The apparatus includes a processor and a memory. The memory is configured to store computer-executable instructions. When a controller runs, the processor executes the computer-executable instructions in the memory, to perform the operation steps of the method in any one of the possible implementations of the fourth aspect and the fifth aspect by using a hardware resource in the controller.

According to an eighth aspect, this disclosure further provides a computer-readable storage medium. The computer-readable storage medium stores instructions, and when the instructions are run on a computer, the computer is enabled to perform the methods in the foregoing aspects.

According to a ninth aspect, this disclosure provides a computer program product including instructions. When the computer program product runs on a computer, the computer is enabled to perform the methods in the foregoing aspects.

Based on the implementations provided in the foregoing aspects, this disclosure may provide more implementations through further combination.

BRIEF DESCRIPTION OF DRAWINGS

FIG. 2b is a logical architecture diagram of the structure of FIG. 2a;

FIG. 2d is a logical architecture diagram of the structure of FIG. 2a;

FIG. 2e is a schematic diagram of an end surface of a retarder in a direction A of FIG. 2a;

FIG. 3b is a logical architecture diagram of the structure of FIG. 3a;

DESCRIPTION OF REFERENCE NUMERALS

Figure 1:
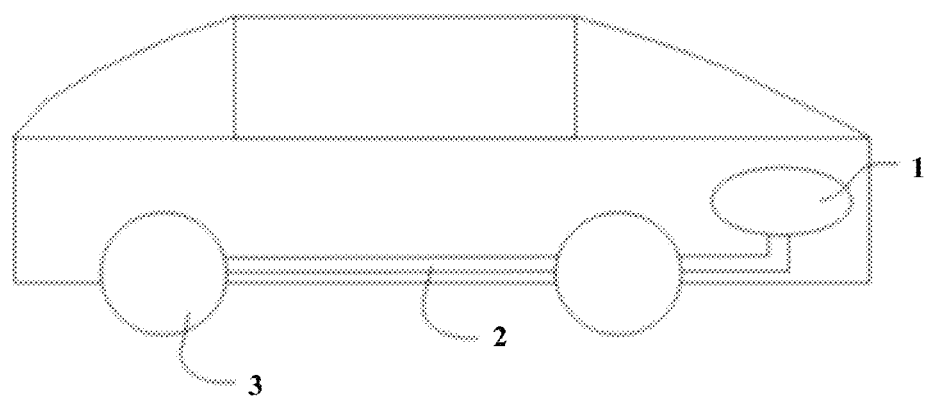
FIG. 1 is a schematic diagram of a structure of a vehicle according to an embodiment of this disclosure.

1: powertrain;
11: housing;
111: second oil sump;
112: first oil sump;
1111: coolant;
12: motor;
121: stator iron core;
122: rotor iron core;
123: end winding;
13: retarder;
131: gear set;
132: first opening;
1321: third distance;
133: second opening;
14: rotating shaft;
151: first passage;
152: second passage; 1521: first switch;
161: third passage; 1611: first valve;
162: fourth passage; 1621: second valve;
17: oil pump;
171: first end;
172: second end;
18: heat exchanger;
19: filter;
2: transmission device;
3: wheel;
40: first control member;
41: spring;
42: fourth opening;
402: block;
401: right end surface;
403: top surface;
441: first gap; and
442: second gap.

DESCRIPTION OF EMBODIMENTS

To make objectives, technical solutions, and advantages of this disclosure clearer, the following further describes this disclosure in detail with reference to the accompanying drawings.

To facilitate understanding of a powertrain and a vehicle that are provided in embodiments of this disclosure, the following first describes a possible application scenario of embodiments of this disclosure. A battery pack of an electric vehicle or a hybrid vehicle can be charged or discharged at a normal power only above a given temperature. If a temperature is excessively low, a charging rate or a discharging rate is greatly reduced, or even a battery assembly is permanently damaged. Currently, in an embodiment, a positive temperature coefficient (PTC) device may be used to heat a battery pack, but this implementation needs to increase component costs and installation expenses.

In an embodiment provided in embodiments of this disclosure, heat generated by stalling or rotating each component (for example, an inverter, a motor, or a retarder) in the powertrain at a low speed is transferred to a heat management cycle of an entire vehicle, and is introduced into a battery assembly to heat a battery pack. In this case, the PTC device does not need to be added. However, in this implementation, to charge the battery pack, an amount of heat generated by each component in the powertrain needs to meet a requirement. If the amount of heat generated by each component in the powertrain fails to meet the requirement, it is also difficult to meet an objective of charging or discharging the battery pack.

In actual application, there are some scenarios in which the amount of heat generated by each component of the powertrain may fail to meet the requirement. For example, a vehicle is in a parking and charging state. In this case, because the vehicle is in the parking state, each component of the powertrain generates a relatively small amount of heat. However, because the vehicle is in the charging state, it is necessary to ensure that the temperature of the battery pack remains above a given temperature. For another example, the motor stalls or rotates at a low speed, and the battery pack is in a discharging state. In this case, because the vehicle stops or rotates at a low speed, each component of the powertrain generates a relatively small amount of heat. However, because the vehicle is in the discharging state, it is necessary to ensure that the temperature of the battery pack remains above a given temperature. In view of this, embodiments of this disclosure provide an embodiment. In this implementation, the motor may stall or rotate at a low speed, so that a large amount of heat generated when the motor stalls or rotates at a low speed in the special control state is used to heat the battery pack. In this implementation, the heat transferred to the battery pack may be increased. However, in this implementation, some possible problems may occur, for example, a temperature of a motor component is excessively high. However, because the motor stalls or rotates at a low speed, it is difficult to form a cooling cycle and it is impossible to effectively dissipate heat for the motor components (such as a rotor iron core).

Based on the foregoing descriptions, this embodiment of this disclosure may provide an embodiment. Heat generated by stalling or rotating each component in the powertrain at a low speed may be used to heat the battery pack, and a heat dissipation effect may also be improved for the motor stalling or rotating at a low speed.

It should be noted that, the solution provided in embodiments of this disclosure may be used to dissipate heat for the motor, and has a relatively good heat dissipation effect. The application scenario mentioned above is merely a possible application scenario. In other scenarios in which a temperature of a motor is relatively high, the solution provided in embodiments of this disclosure may also be used to cool the motor. This is not limited in embodiments of this disclosure.

It should be noted that, in embodiments of this disclosure, "communication" of two structures means that coolant can flow between the two structures but an intermediate structure may also be disposed; and "connection" of two structures means that the two structures are directly connected and coolant can flow.

Based on the foregoing descriptions, the following describes embodiments of this disclosure. First, FIG. 1 is a schematic diagram of a structure of a vehicle according to an embodiment of this disclosure. Referring to FIG. 1, an embodiment of this disclosure provides a vehicle. The vehicle includes a powertrain 1 in the foregoing embodiment, a transmission device 2, and a wheel 3. The powertrain 1 is connected to the transmission device 2 in a transmission manner, and the transmission device 2 is in turn connected to the wheel 3 in a transmission manner, so that a driving force output by the powertrain 1 can be transferred to the driving wheel 3 by using the transmission device 2 to drive the vehicle to travel. The powertrain 1 has a relatively good heat dissipation effect for a motor, and the powertrain 1 has relatively high working stability and a relatively long service life. Therefore, power performance of the vehicle can be improved and a service life of the vehicle can be prolonged.

Figure 2A:
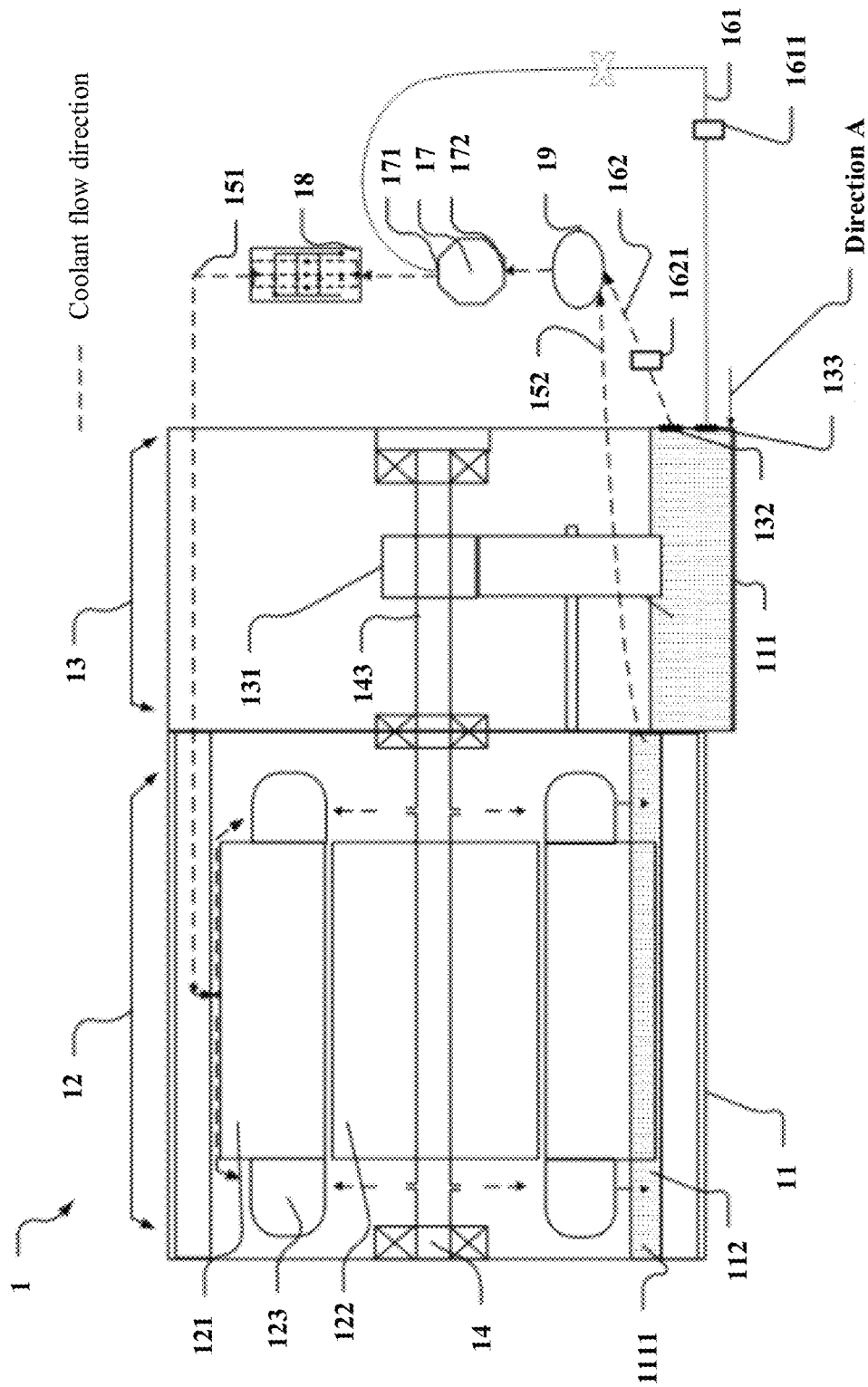
FIG. 2a is a schematic diagram of a structure of a powertrain according to an embodiment of this disclosure.

For a specific structure of the powertrain 1 provided in this disclosure, refer to FIG. 2a. FIG. 2a is a schematic diagram of a structure of a powertrain according to an embodiment of this disclosure. The powertrain 1 includes a housing 11, and a motor 12, a retarder 13, and a rotating shaft 14 that are disposed in the housing 11. The rotating shaft 14 is connected to the motor 12 and the retarder 13 in a transmission manner.

As shown in FIG. 2a, the motor 12 includes a stator iron core 121, an end winding 123, and a rotor iron core 122. The end winding 123 is disposed on the stator iron core 121, and the stator iron core 121 is disposed opposite to the rotor iron core 122. A part of the rotating shaft 14 is fixedly fitted in the rotor iron core 122, and may be disposed coaxially with the rotor iron core.

A first oil sump 112 may be disposed inside the motor 12. In an embodiment, the first oil sump 112 may be disposed on a side or at a bottom of the motor 12, for example, may be disposed in an area that is a side of the motor 12 and closer to a bottom of the motor 12. The first oil sump 112 inside the motor 12 is configured to collect coolant inside the motor 12. The first oil sump 112 inside the motor 12 has a plurality of positions. This is not limited in embodiments of this disclosure. The position of the first oil sump 112 shown in the accompanying drawings is merely for illustration.

As shown in FIG. 2a, the retarder 13 includes a gear set 131, and a part of the rotating shaft 14 may be fixedly fitted in a drive gear 1311 of the gear set 131, so that the rotor iron core 122 drives the gear set 131. The gear set 131 of the retarder 13 may decelerate the rotation output by the motor 12.

The coolant inside the retarder 13 flows into the bottom of the housing of the retarder 13. In an embodiment, a bottom area of the housing of the retarder 13 may be referred to as a second oil sump 111. In another embodiment, a second oil sump 111 may be disposed inside the retarder 13. In an embodiment, a second oil sump 111 may be disposed on a side or at a bottom of the retarder 13, for example, may be disposed in an area that is a side of the retarder 13 and closer to a bottom of the retarder 13. The second oil sump 111 inside the retarder 13 is configured to collect coolant inside the retarder 13. The second oil sump 111 inside the retarder 13 has a plurality of positions. This is not limited in embodiments of this disclosure. The position of the second oil sump 111 shown in the accompanying drawings is merely for illustration.

As shown in FIG. 2a, the powertrain 1 further includes an oil pump system. The oil pump system includes an oil pump 17, and the oil pump includes a first end 171 and a second end 172.

When the oil pump 17 is rotating, a port at the first end 171 is an oil outlet of the oil pump. It may be understood that coolant in the oil pump 17 flows out of the port at the first end 171, or that a passage connected to the first end 171 is an oil outlet passage. When the oil pump is rotating, a port at the second end 172 is an oil inlet of the oil pump. It may be understood that coolant flows into the oil pump 17 from the port at the second end 172, or that a passage connected to the second end 172 is an oil inlet passage. The coolant mentioned in embodiments of this disclosure may be liquid used for cooling and lubricating, or may be insulating liquid. In an embodiment, the coolant may be cooling oil.

When the oil pump 17 is reversing, a port at the first end 171 is an oil inlet of the oil pump. It may be understood that a passage connected to the first end 171 is an oil inlet passage. When the oil pump 17 is reversing, a port at the second end 172 is an oil outlet of the oil pump. It may be understood that a passage connected to the second end 172 is an oil outlet passage.

As shown in FIG. 2a, the oil pump system may further include a heat exchanger 18. The oil pump 17 drives the coolant in the second oil sump 111 to flow through the heat exchanger 18 for cooling, and then flow into the motor 12 and the retarder 13, so that the coolant with a relatively low temperature is used to dissipate heat for the motor 12 and the retarder 13. In addition, after cooling and lubricating the motor 12, the temperature of the coolant in the first oil sump 112 increases, and the second oil sump 111 includes the coolant from the first oil sump 112 and the coolant for lubricating and cooling the retarder 13. The coolant flowing into the oil pump 17 carries heat generated by the motor 12 and the retarder 13, and after the coolant passes through the heat exchanger 18, the heat can be transferred to the battery pack for heating the battery pack. When the heat exchanger 18 is specifically disposed, the heat exchanger 18 may be a common oil-water heat exchanger 18, or certainly may be another type of heat exchanger 18. This is not specifically limited in this disclosure.

After circulation, the coolant has impurities inside. As shown in FIG. 2a, the oil pump system may further include a filter 19 to filter the coolant. When the filter 19 is specifically disposed, the filter 19 may be adjacent to the second oil sump 111, to be specific, the coolant in the second oil sump 111 may first pass through the filter 19, then pass through the oil pump 17, and then flow into the heat exchanger 18, so as to output clean coolant with a relatively low temperature.

As shown in FIG. 2a, the first end 171 of the oil pump 17 may communicate with the motor 12 through the first passage 151 to transfer the coolant to the motor 12 for cooling the components in the motor 12. In an embodiment, the motor 12 may be provided with an oil inlet, and the oil inlet of the motor 12 communicates with the first end of the oil pump 17 through the first passage 151. In an embodiment, when the oil pump system drives the coolant to spray the stator iron core 121, the coolant flows on the surface of the stator iron core 121, and flows to the end winding 123, to dissipate heat for the stator iron core 121 and the end winding 123.

In an embodiment, the first end 171 of the oil pump 17 may further communicate with the retarder 13 to transfer the coolant to the retarder 13 for cooling the components in the retarder 13. In an embodiment, the retarder 13 may be provided with an oil inlet, and the oil inlet of the retarder 13 communicates with the first end of the oil pump 17 through a fifth passage. FIG. 2a does not show a schematic diagram of an oil path through which the coolant flows into the retarder from the oil pump through the fifth passage.

As shown in FIG. 2a, in this embodiment of this disclosure, the first end 171 of the oil pump 17 may further communicate with the second oil sump 111 of the retarder 13. For example, the first end 171 of the oil pump 17 communicates with the second oil sump 111 of the retarder 13 through the third passage 161. In an embodiment, an opening may be provided on the housing of the retarder 13, for example, a second opening 133 is provided on the housing of the retarder 13, and one end of the third passage 161 is connected to the second opening 133, so that as the oil pump reverses, the coolant in the second oil sump 111 of the retarder 13 may flow out of the retarder 13 through the second opening 133 and further into the first end 171 of the oil pump through the third passage 161. In an embodiment, a first valve 1611 may be disposed on the third passage 161. When the oil pump 17 is rotating, the first valve 1611 is in a closed state. In this way, when the oil pump 17 is rotating, the coolant does not flow through the third passage 161. When the oil pump 17 is reversing, the first valve 1611 is in an open state. In this way, when the oil pump 17 is reversing, the coolant flows through the third passage, to be specific, flows into the oil pump 17 from the second oil sump 111 through the third passage.

In this embodiment of this disclosure, the second end 172 of the oil pump 17 may communicate with the first oil sump of the motor, so that when the motor is rotating, the coolant in the first oil sump may be transferred to the oil pump and output again through the first end of the oil pump, so as to flow into the motor and the retarder again for cooling the components in the motor and the retarder.

As shown in FIG. 2a, the second end 172 of the oil pump 17 may communicate with the second oil sump 111 of the retarder 13, for example, the second end of the oil pump 17 may communicate with the second oil sump 111 through the fourth passage 162. In an embodiment, an opening may be provided on the housing of the retarder 13, for example, a first opening 132 is provided on the housing of the retarder 13, and one end of the fourth passage 162 is connected to the first opening 132, so that as the oil pump rotates, the coolant in the second oil sump 111 of the retarder 13 may flow out of the retarder 13 through the first opening 132 and further into the second end 172 of the oil pump through the fourth passage 162. A second valve 1621 may be disposed on the fourth passage 162. When the oil pump 17 is reversing, the second valve 1621 is in a closed state. In this way, when the oil pump 17 is reversing, the coolant does not flow through the fourth passage 162. When the oil pump 17 is rotating, the second valve 1621 is in an open state. In this way, when the motor is rotating, the coolant in the second oil sump 111 can be transferred to the oil pump 17 and output again through the first end 171 of the oil pump 17, so as to flow into the motor 12 and the retarder 13 again for cooling the components in the motor 12 and the retarder 13. In an embodiment, the first oil sump 112 communicates with the second end 172 of the oil pump 17, and the first oil sump 112 no longer communicates with the second oil sump 111. The second oil sump communicates with the second end 172 of the oil pump 17. To be specific, the coolant in the first oil sump 112 may flow directly into the oil pump 17, and does not need to flow into the second oil sump 111.

The following describes a flow path of the coolant during rotation of the oil pump with reference to the structure in FIG. 2a. When the oil pump is rotating, the second end 172 of the oil pump 17 is an oil inlet end. In this case, the first valve 1611 on the third passage 161 is in a closed state or the third passage 161 is closed, whereas the second valve 1621 on the fourth passage 162 is in an open state or the fourth passage 162 is open. In this case, as the oil pump 17 rotates, coolant flows into the oil pump from the second oil sump 111 through the fourth passage 162, and at the same time coolant also flows into the oil pump from the first oil sump 112. The first end 171 of the oil pump 17 is an oil outlet end. After flowing from the oil outlet end of the oil pump 17, the coolant flows into the heat exchanger 18, and then into the motor 12 and the retarder 13 for cooling components in the motor 12 and the retarder 13.

Figure 2B:
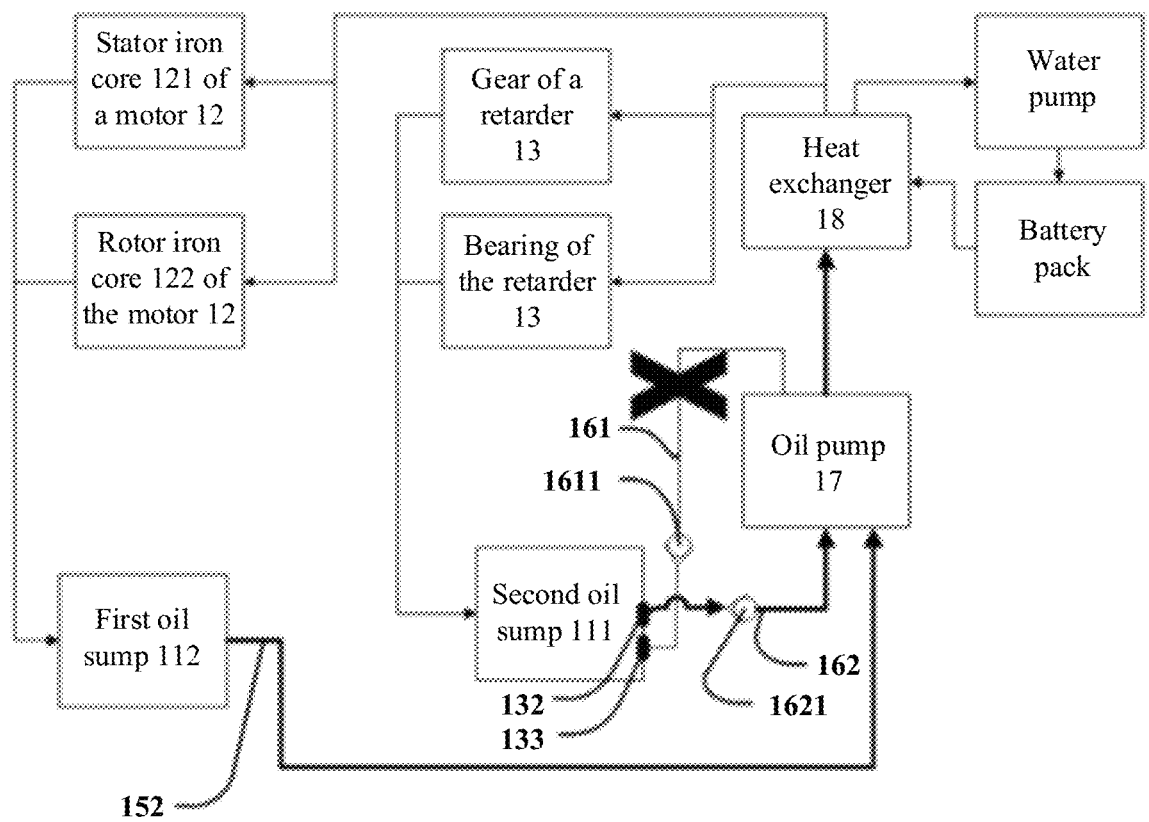

FIG. 2b shows an example of a logical architecture diagram of the structure of FIG. 2a based on the structure shown in FIG. 2a. As shown in FIG. 2b, the first oil sump 112 is connected to the second end 172 of the oil pump 17 through the second passage 152. In FIG. 2b, there is no communication between the first oil sump 112 and the second oil sump 111. The second passage 152 does not have a first switch 1521. The second oil sump 111 is connected to the second end 172 of the oil pump 17 through the fourth passage 162. A second valve 1621 is disposed on the fourth passage 162. The second oil sump 111 is connected to the first end 171 of the oil pump 17 through the third passage 161. A first valve 1611 is disposed on the third passage 161.

As shown in FIG. 2b, both the first valve 1611 and the second valve 1621 may be one-way valves. When the oil pump is rotating, the first valve 1611 on the third passage 161 is in a closed state or the third passage 161 is closed, whereas the second valve 1621 on the fourth passage 162 is in an open state or the fourth passage 162 is open. In this embodiment of this disclosure, a cross in the accompanying drawings indicates that the passage is closed. For example, a cross in the third passage 161 in FIG. 2b indicates that the third passage is closed. Crosses in other diagrams have similar meanings, and details are not described again.

As shown in FIG. 2b, the oil pump 17 is connected to the heat exchanger 18. Heat on the coolant flowing from the oil pump 17 into the heat exchanger 18 may be transferred through the heat exchanger 18 to a water pump and further to a battery pack. In addition, the coolant flowing from the oil pump 17 into the heat exchanger 18 may be transferred again to the motor and the retarder for cooling the motor and the retarder. FIG. 2b shows an example of a possible schematic diagram of coolant flowing into the motor and the retarder. As shown in FIG. 2b, coolant output from the heat exchanger 18 may be transferred to the stator iron core 121 of the motor 12 and the rotor iron core 122 of the motor 12 for cooling the stator iron core 121 and the rotor iron core 122. FIG. 2b shows an example of a possible schematic diagram of coolant flowing into the motor and the retarder. As shown in FIG. 2b, coolant output from the heat exchanger 18 may be transferred to a gear of the retarder 13 and a bearing of the retarder 13 for cooling the gear and the bearing of the retarder 13.

Figure 2C:
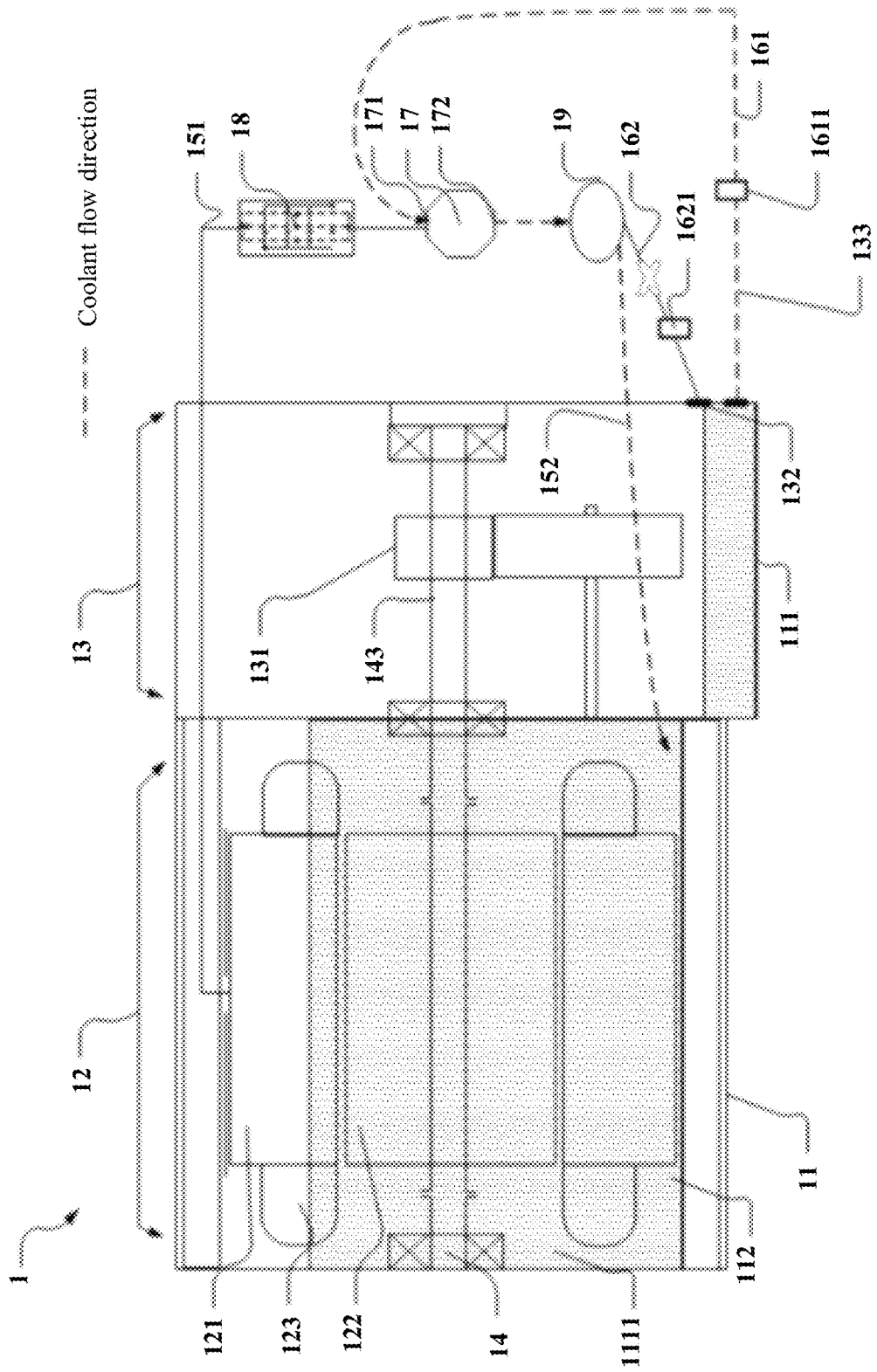
FIG. 2c is a schematic diagram of a structure of a powertrain according to an embodiment of this disclosure.

FIG. 2c shows an example of a schematic diagram of a flow path of the coolant in the structure shown in FIG. 2a when the oil pump is reversing. The structure of FIG. 2c is the same as the structure of FIG. 2a except that FIG. 2a is a schematic diagram of a flow path of the coolant when the oil pump is rotating. As shown in FIG. 2c, when the oil pump is reversing, the second end 172 of the oil pump 17 is an oil outlet end, and the first end 171 of the oil pump 17 is an oil inlet end. In this case, the first valve 1611 on the third passage 161 is in an open state or the third passage 161 is open, whereas the second valve 1621 on the fourth passage 162 is in a closed state or the fourth passage 162 is closed. In this case, as the oil pump 17 reverses, the coolant of the second oil sump 111 flows into the oil pump 17 through the third passage 161. Because the second end 172 of the oil pump 17 is switched to an oil outlet end, the fourth passage 162 connected to the second end 172 of the oil pump is in a closed state, and the second passage 152 connected to the second end 172 of the oil pump 17 is in an open state. As the oil pump 17 reverses, the coolant 1111 in the oil pump 17 is input into the motor through the second passage 152 and accumulates in a cavity of the motor 12. When motor components (such as a rotor iron core) are immersed by the coolant in the motor cavity, the motor components (such as a rotor iron core) can be cooled more effectively. FIG. 2c shows a possible situation in which coolant 1111 accumulates in the motor cavity. As shown in FIG. 2c, as the oil pump reverses, a horizontal plane of coolant in a retarder cavity gradually decreases, whereas a horizontal plane of coolant in the motor cavity gradually increases. In FIG. 2c, the horizontal plane of the coolant in the motor cavity is higher than the horizontal plane of the coolant in the retarder.

Figure 2D:
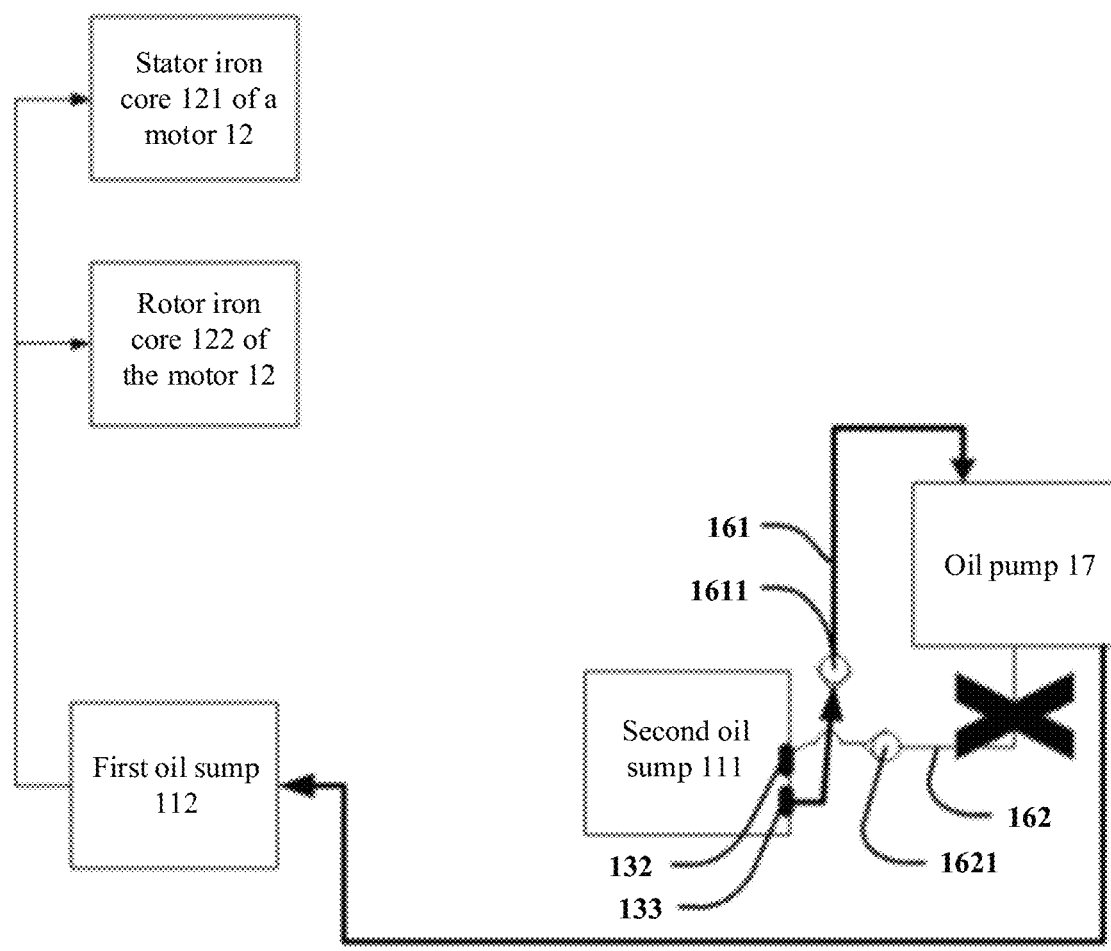

FIG. 2d shows an example of a logical architecture diagram of the structure of FIG. 2c based on the structure shown in FIG. 2c. As shown in FIG. 2d, the first oil sump 112 is connected to the second end 172 of the oil pump 17 through the second passage 152. In FIG. 2d, there is no communication between the first oil sump 112 and the second oil sump 111. The second passage 152 does not have a first switch 1521. The second oil sump 111 is connected to the second end 172 of the oil pump 17 through the fourth passage 162. A second valve 1621 is disposed on the fourth passage 162. The second oil sump 111 is connected to the first end 171 of the oil pump 17 through the third passage 161. A first valve 1611 is disposed on the third passage 161.

As shown in FIG. 2d, both the first valve 1611 and the second valve 1621 may be one-way valves. When the oil pump is reversing, the first valve 1611 on the third passage 161 is in an open state or the third passage 161 is open, whereas the second valve 1621 on the fourth passage 162 is in a closed state or the fourth passage 162 is closed.

As shown in FIG. 2d, when the oil pump 17 is reversing, the coolant is input into the oil pump from the second oil sump 111, and then flows into the motor cavity from the oil pump. The coolant may accumulate in the motor cavity, to immerse the motor components (such as the rotor iron core 122) for cooling the motor components.

Figure 2E:
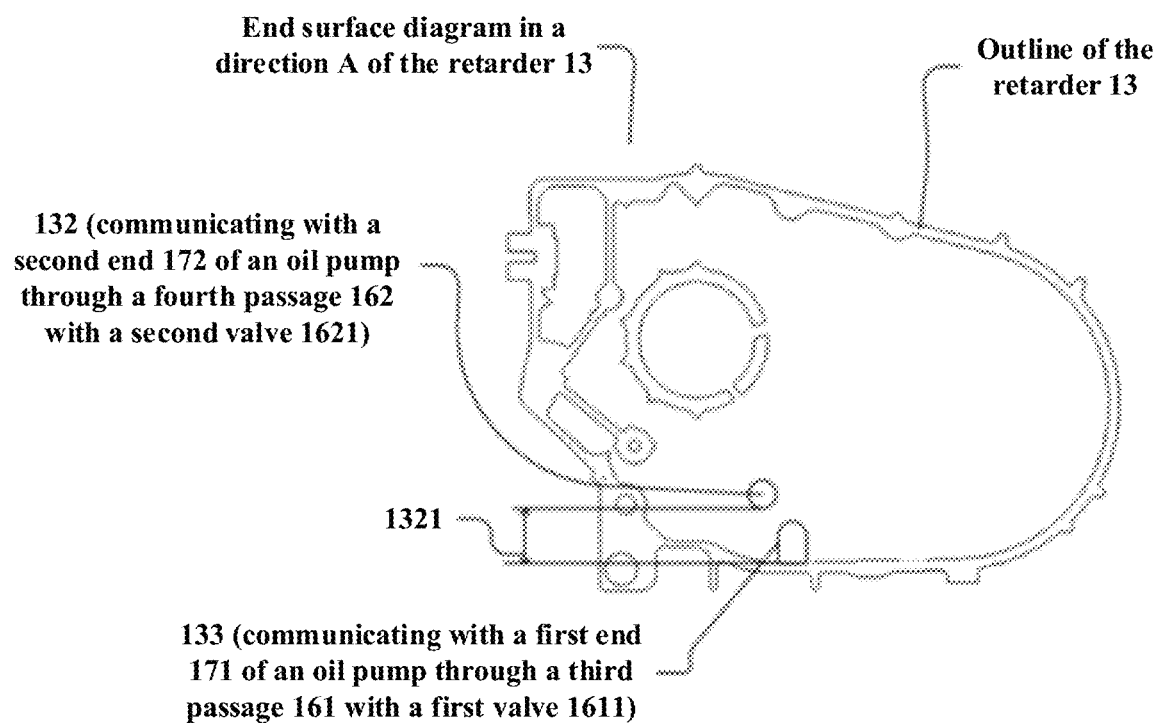

FIG. 2a to FIG. 2d are schematic diagrams of possible positions of the first opening 132 and the second opening 133 on the retarder, and FIG. 2e is a schematic diagram of an end surface of the retarder in the direction A of FIG. 2a. As shown in FIG. 2e, the first opening 132 and the second opening 133 may be provided on the housing of the retarder, and shapes of the first opening and the second opening are not limited. In an embodiment, a bottom of the first opening 132 is higher than a bottom of the second opening 133. In other words, the bottom of the second opening 133 is lower. In an embodiment, a first distance may be a distance from the bottom of the first opening 132 to the bottom of the second oil sump in the retarder cavity. A second distance may be a distance from the bottom of the second opening 133 to the bottom of the second oil sump in the retarder cavity. FIG. 2e shows a third distance 1321. The third distance is a difference obtained by subtracting the second distance from the first distance. In an embodiment, the first distance may be greater than the second distance. Because the second opening 133 is connected to the third passage 161, when the oil pump is reversing, more coolant in the second oil sump 111 may be sucked, or it may be understood that when the oil pump is reversing, almost all coolant in the retarder is sucked into the motor cavity, so that more coolant can be input into the motor cavity to immerse and cool motor components (such as a rotor iron core). Therefore, the bottom of the second opening 133 can be as low as possible. In an embodiment, the second opening may be alternatively provided at the bottom of the retarder cavity, or at the bottom of the second oil sump 111, whereas the first opening may be provided on a side of the retarder (for example, the first opening is in a position of the first opening shown in FIG. 2a). However, the bottom of the first opening is higher, and the first opening is connected to the fourth passage 162. Therefore, it may be understood that when the oil pump is rotating, the position of the first opening is relatively high, and therefore, the oil pump can suck a relatively small amount of coolant from the retarder. Therefore, the oil pump probably sucks more coolant from the motor, so that more coolant may be sucked from the motor cavity to the retarder, to reduce a mechanical loss in the motor cavity due to the friction between the liquid and the rotor that rotates at a high speed.

With reference to related content in FIG. 2a to FIG. 2e, the following further describes embodiments of this disclosure.

As shown in FIG. 2a and FIG. 2b, in an embodiment, the powertrain further includes a first controller, and the first controller is connected to the oil pump. The first controller is configured to control the rotation or reversion of the oil pump. There are a plurality of solutions in which the first controller controls the rotation or reversion of the oil pump. The following describes solutions a1 and a2 as examples.

Solution a1.

In an embodiment, the oil pump is controlled to reverse when a first condition is met.

In another embodiment, the oil pump is controlled to rotate when a second condition is met.

In an embodiment, the first condition may be understood as a trigger condition, and if the first condition is met, the oil pump is triggered to reverse. In another embodiment, when the oil pump is rotating, if the first condition is met, the oil pump is triggered to reverse.

In another embodiment, if the first condition is met, the oil pump is triggered to reverse until a first stop condition is met. In an embodiment, the first stop condition may be the second condition. In this case, the oil pump may start to rotate. In another embodiment, the first stop condition may be stopping rotating the oil pump. For example, when a parking vehicle is being charged but the battery pack is fully charged, because the battery pack neither charges nor discharges, the oil pump may stop reversing.

In an embodiment, the second condition may be understood as a trigger condition, and if the second condition is met, the oil pump is triggered to rotate. In another embodiment, when the oil pump is reversing, if the second condition is met, the oil pump is triggered to rotate.

In another embodiment, if the second condition is met, the oil pump is triggered to rotate until a second stop condition is met. In an embodiment, the second stop condition may be the first condition. In this case, the oil pump may start to reverse. In another embodiment, the second stop condition may be stopping rotating the oil pump. For example, when a parking vehicle is being charged but the battery pack is fully charged, because the battery pack neither charges nor discharges, the oil pump may stop rotating.

The following describes the first condition and the second condition used in embodiments of this disclosure.

The first condition and the second condition are set in a plurality of forms. In an embodiment, the first condition includes at least one of the following conditions a1 to a7. Each or any combination of the conditions a1 to a7 may be used as the first condition.

Condition a1: A temperature of the motor is greater than a first temperature threshold.

In the condition a1, the temperature of the motor may be a temperature of one component of the motor, for example, a temperature of a rotor iron core of the motor or a temperature of a stator iron core of the motor. In an embodiment, if a temperature of at least one component (including a stator iron core, a rotor iron core, a housing, or the like) in the motor is greater than the first temperature threshold, it may be determined that the condition a1 is met. In another embodiment, in the condition a1, the temperature of the motor may be a temperature of one component in one or more specific components of the motor, and if a temperature of at least one component in the one or more specific components is greater than the first temperature threshold, it may be determined that the condition a1 is met. In another embodiment, in the condition a1, the temperature of the motor may be an average temperature of several specific components.

Condition a2: A running time of the motor is greater than a first running time threshold.

In the condition a2, if the motor runs for a long time, it is inferred that the temperature of the motor may be relatively high. If the motor runs for a short time, it is inferred that the temperature of the motor may be relatively low. Therefore, in an embodiment, the condition a2 may be used independently as a condition for triggering the oil pump to reverse, or the condition a2 and other content may be combined as a condition for triggering the oil pump to reverse.

Condition a3: A running time of the oil pump is greater than a second running time threshold.

In the condition a3, if the oil pump runs for a long time, it is inferred that the temperature of the motor may be relatively high. If the oil pump runs for a short time, it is inferred that the temperature of the motor may be relatively low. Therefore, in an embodiment, the condition a3 may be used independently as a condition for triggering the oil pump to reverse, or the condition a3 and other content may be combined as a condition for triggering the oil pump to reverse.

Condition a4: A temperature of the battery pack is less than a first battery pack temperature threshold.

In the condition a4, in an embodiment, the temperature of the battery pack is less than the first battery pack temperature threshold, and if the battery pack is in a charging or discharging state, it is inferred that the battery pack may be heated because heat generated by components in the powertrain may be increased by using some methods (such as energizing the motor). In this case, it may be inferred that the motor may need to be cooled. In an embodiment, the condition a4 may be used independently as a condition for triggering the oil pump to reverse. In an embodiment, the condition a4 and other conditions may be combined as a condition for triggering the oil pump to reverse.

Condition a5: A rotational speed of the motor is less than a first rotational speed threshold.

Condition a6: An amount of coolant accumulating in the motor cavity is less than a first coolant capacity threshold.

In an embodiment, the powertrain further includes a sensor assembly. The sensor assembly is disposed on an inner wall of the motor cavity, and is configured to detect the amount of coolant accumulating in the motor cavity.

Condition a7: A height difference between a horizontal plane of coolant in the first oil sump and a horizontal plane of coolant in the second oil sump is not greater than a first height difference threshold.

In the condition a7, when the oil pump is rotating, the height difference between the horizontal plane of the coolant in the first oil sump and the horizontal plane of the coolant in the second oil sump is basically zero. In an embodiment, the first condition may be based on the condition a7. For example, when the oil pump is reversing, the height difference between the horizontal plane of the coolant in the first oil sump and the horizontal plane of the coolant in the second oil sump is relatively large. Therefore, when the oil pump is rotating, the height difference between the horizontal plane of the coolant in the first oil sump and the horizontal plane of the coolant in the second oil sump gradually decreases. When the height difference is not greater than the first height difference threshold, the oil pump may stop rotating and start to reverse.

In an embodiment, the second condition includes at least one of the following conditions b1 to b8. Each or any combination of the conditions b1 to b8 may be used as the second condition.

Condition b1: A temperature of the motor is not greater than a preset second temperature threshold.

In an embodiment, the condition b1 may be understood as follows: When the temperature of the motor is relatively low and is less than the second temperature threshold, the oil pump may be triggered to rotate, without the need of reversing the oil pump to immerse and cool the oil pump.

In an embodiment, the temperature of the motor in the condition b1 may be a temperature of at least one motor component in the motor that is not greater than the preset second temperature threshold, in other words, the condition b1 is met. In another embodiment, the condition b1 may be that if temperatures of several specific components in the motor, such as a rotor iron core, are not greater than the preset second temperature threshold, it may be determined that the condition b1 is met.

In this embodiment of this disclosure, the second temperature threshold may be equal or unequal to the first temperature threshold. For example, the second temperature threshold may be less than the first temperature threshold. In this way, the oil pump may be triggered to reverse only when the temperature of the motor is relatively high, and the oil pump may be triggered to rotate only when the temperature of the motor is relatively low.

Condition b2: A running time of the motor is not greater than a preset third running time threshold.

In this embodiment of this disclosure, the third running time may be equal or unequal to the first running time. For example, the first running time may be greater than the third running time. In this way, the oil pump may be triggered to reverse only when the motor runs for a longer time.

Condition b3: A running time of the oil pump is not greater than a fourth running time threshold.

In this embodiment of this disclosure, the fourth running time may be equal or unequal to the second running time. For example, the second running time may be greater than the fourth running time. In this way, the oil pump may be triggered to reverse only when the oil pump runs for a longer time.

Condition b4: A temperature of the battery pack is not less than a preset second battery pack temperature threshold.

In an embodiment, the condition b4 may be understood as follows: The temperature of the battery pack is relatively low. In this case, heat generated by the powertrain needs to be transferred to the battery pack through the rotation of the oil pump, so as to heat the battery pack.

In this embodiment of this disclosure, the second battery pack temperature threshold may be equal or unequal to the first battery pack temperature threshold. This is not limited in this embodiment of this disclosure.

Condition b5: A rotational speed of the motor is not less than a preset second rotational speed threshold.

The condition b5 may be understood as follows: When the rotational speed of the motor is relatively high, the motor components may be cooled by spraying. In this case, the oil pump does not need to reverse and the motor does not need to be cooled in an immersion manner.

In this embodiment of this disclosure, the second rotational speed threshold may be equal or unequal to the first rotational speed threshold. This is not limited in this embodiment of this disclosure.

Condition b6: An amount of coolant accumulating in the motor cavity is not less than a preset second coolant capacity threshold.

In this embodiment of this disclosure, the second coolant capacity threshold may be equal or unequal to the first coolant capacity threshold. This is not limited in this embodiment of this disclosure.

Condition b7: A decrease amount of a current of the oil pump in second preset duration is greater than a current threshold.

Another possible manner of the condition b7 includes: a change in a rotational speed of the oil pump in first preset duration is less than a rotational speed change threshold, and a decrease amount of a current of the oil pump in second preset duration is greater than a current threshold. In this embodiment of this disclosure, the first preset duration may be equal or unequal to the second preset duration. This is not limited in this embodiment of this disclosure. In this implementation, it may be understood that when the rotational speed of the oil pump is basically unchanged, if it is detected that the current of the oil pump changes greatly, for example, sharply decreases, it indicates that air suction may occur in the oil pump, and the oil in the retarder may have been sucked out. In this case, in an embodiment, the oil pump may stop reversing based on the condition b7 and start to rotate.

Condition b8: A height difference between a horizontal plane of coolant in the first oil sump and a horizontal plane of coolant in the second oil sump is greater than a second height difference threshold.

In the condition b8, when the oil pump is reversing, the height difference between the horizontal plane of the coolant in the first oil sump and the horizontal plane of the coolant in the second oil sump is becoming larger. When the height difference is greater than the second height difference threshold, it may indicate that a large amount of coolant is sucked into the motor cavity. In this case, when the second condition is based on the condition b8, the oil pump may stop reversing and start to rotate.

The first condition may include any one of the conditions a1 to a7, or may include any combination of the conditions a1 to a7. The second condition may include any one of the conditions b1 to b8, or may include any combination of the conditions b1 to b8.

It should be noted that there is no necessary correspondence between the first condition and the second condition. For example, if the first condition includes at least the condition a1, the second condition may include the condition b1, or may not include the condition b1. There are a plurality of options available for the first condition, and there are also a plurality of options available for the second condition. Several examples are provided below.

In an embodiment, the first condition includes the condition a1, and the second condition includes the condition b7. If the oil pump is reversing, the oil inlet end of the oil pump can obtain the coolant from the second oil sump of the retarder only, and the oil outlet end of the oil pump outputs the coolant to the motor through the second passage only, so that the amount of coolant in the retarder is decreasing. Consequently, the coolant that can be sucked by the oil pump may be decreasing too, and air suction may occur. In this way, the current of the oil pump may drastically decrease in a short time when the oil pump remains at the same preset rotational speed, in other words, the condition b6 is met. A current sensor can detect this situation in which the increase amount of the current in the preset duration is less than the preset current threshold. When this situation occurs, it indicates that the coolant in the retarder is basically sucked out, the oil pump is thus controlled to switch from reversion to rotation, so that the coolant flows out of the motor cavity. In addition, when the oil pump is rotating, if the condition a1 is met, it indicates that the temperature of the motor is greater than the preset first temperature threshold. In this case, the oil pump may be reversed. The oil inlet end of the oil pump may obtain the coolant from the second oil sump of the retarder only, and the oil outlet end of the oil pump outputs the coolant to the motor through the second passage only. In this way, the coolant may accumulate in the motor cavity for cooling by immersing components (such as a rotor iron core), thereby improving a heat dissipation effect.

In another embodiment, the first condition includes the condition a1, and the second condition includes the condition b7. An application scenario of this possible implementation is as follows: When the motor stops rotating or rotates at a low speed, for example, lower than the first rotational speed threshold, and the temperature of the battery pack is relatively low, for example, lower than the first battery pack temperature threshold, heat generated by the powertrain needs to be transferred to the battery pack to heat the battery pack. In this disclosure scenario, the motor may be energized by using the second controller, and motor components (such as a rotor iron core) generate heat. In this case, the oil pump may rotate first, so that the coolant brings heat generated by the motor components to the battery pack to heat the battery pack. In this disclosure scenario, further, when the first condition is met, the oil pump may be triggered to reverse, so that the coolant accumulates in the motor to immerse and cool the motor components (such as a rotor iron core). In addition, when the second condition is met, for example, when the condition b8 is met, or the oil pump may be in an air suction state, the oil pump stops reversing and starts to rotate, so that the coolant flows out of the motor cavity, and heat is transferred to the battery pack through the heat exchanger.

Solution a2.

In an embodiment, when a first condition is met, the following is periodically performed:

rotating the oil pump for third preset duration, and reversing the oil pump for fourth preset duration.

In the solution a2, when the first condition is met, the oil pump may first rotate for the third preset duration, then the oil pump may reverse for the fourth preset duration, then the oil pump may rotate for the third preset duration, then the oil pump may reverse for the fourth preset duration, and so on.

In another embodiment, when the first condition is met, the oil pump may first reverse for the fourth preset duration, then the oil pump may rotate for the third preset duration, then the oil pump may reverse for the fourth preset duration, then the oil pump may rotate for the third preset duration, and so on.

In the solution a2, the third preset duration and the fourth preset duration may be separately set, and the third preset duration and the fourth preset duration may be equal or unequal. In an embodiment, the fourth preset duration may be determined based on duration from a time when the oil pump reverses to a time when the motor cavity is filled with oil. The fourth preset duration at least meets a condition that after the oil pump is reversing for the fourth preset duration, the coolant in the motor cavity reaches a preset coolant capacity threshold. In other words, after the oil pump is reversing for the fourth preset duration, coolant in the motor cavity is sufficient to immerse motor components (such as a rotor iron core). In this way, the motor components (such as a rotor iron core) can be immersed and cooled, thereby improving a cooling effect.

In a possible application scenario, a prerequisite may be added to the solution a2: the temperature of the battery pack is less than the temperature threshold. In this case, if the rotational speed of the motor is not less than the first rotational speed threshold, the oil pump is controlled to rotate. In another embodiment, the temperature of the battery pack is less than the temperature threshold. In this case, if the motor stops rotating or rotates at a low speed, the motor may be energized, so that when the rotational speed of the motor is less than the first rotational speed threshold, the following is periodically performed: rotating the oil pump for the third preset duration, and reversing the oil pump for the fourth preset duration.

Based on the related description of the solution a2, the motor components (such as a rotor iron core) may be cooled, and heat of the motor may also be taken away by the coolant, and then transferred to the battery pack to heat the battery pack. Moreover, the solution of periodic rotating and reversing of the oil pump is relatively simple and easy to implement.

In another embodiment, a second controller is further included. The second controller is configured to: start to stall the motor, or rotate the motor at a speed less than a third rotational speed threshold when a temperature of the battery pack is less than a preset third battery pack temperature threshold and the battery pack needs to be charged or discharged. In this scenario, when the motor is energized, the oil pump may first start to rotate, and then, in subsequent operations, the rotation and reversion operations of the oil pump may be controlled by using the solution a1 or a2.

In another embodiment, a direct current is supplied to the motor when the temperature of the battery pack is less than the preset third battery pack temperature threshold and the battery pack needs to be charged or discharged. In this way, the motor may rotate at a speed less than the third rotational speed threshold.

In another embodiment, an alternating current is supplied to the motor when the temperature of the battery pack is less than the preset third battery pack temperature threshold and the battery pack needs to be charged or discharged. In this case, the motor may be a permanent magnet synchronous motor or the like. In this way, the motor may rotate at a speed less than the third rotational speed threshold. In an embodiment, when an alternating current is supplied to the motor, an eddy current loss may be caused on silicon steel sheets of the stator and rotor iron cores and a magnet steel of the rotor iron core, thereby increasing the total heat amount generated by the motor. This disclosure scenario may further increase the heat generated by the powertrain. However, in this disclosure scenario, the oil coolant cannot flow effectively in the rotor iron core due to the suspension or low speed rotation of the rotor iron core of the motor, and if the external environment is relatively low, the viscosity of the coolant is relatively high in the low temperature scenario. In this case, it is difficult for the oil pump to drive the coolant to circulate normally in the powertrain, and the motor has a relatively poor cooling effect. Basically no cooling of the rotor iron core causes the temperature of the magnet steel of the rotor iron core to rise continuously, and a phenomenon of overtemperature and magnetic loss may occur. In view of this, in the solution provided in this embodiment of this disclosure, the motor components may be immersed in the coolant by reversing the oil pump, achieving better heat dissipation for the motor components.

In another embodiment, a third controller is further included. The third controller is connected to the motor. The third controller is configured to start a derating protection operation for the motor when the temperature of the motor is greater than a third temperature threshold in a case in which the oil pump is reversing.

The derating protection operation for the motor may be implemented in a plurality of forms, for example, reducing a power of the motor. The derating protection operation for the motor may be implemented in a plurality of forms, for example, reducing a power of the motor, reducing a torque without changing a rotational speed, or reducing a rotational speed without changing a torque. The third temperature threshold may be the same as or different from the first temperature threshold. In an embodiment, the third temperature threshold may be lower than the first temperature threshold. When the oil pump is reversing, the coolant accumulates in the motor cavity to reduce the temperature of the rotor iron core of the motor. However, after a period of time, the temperature of the motor may rise again after reduction because the coolant accumulates in the motor cavity and does not flow. In this case, in an embodiment, the derating protection operation may be started.

Figure 3A:
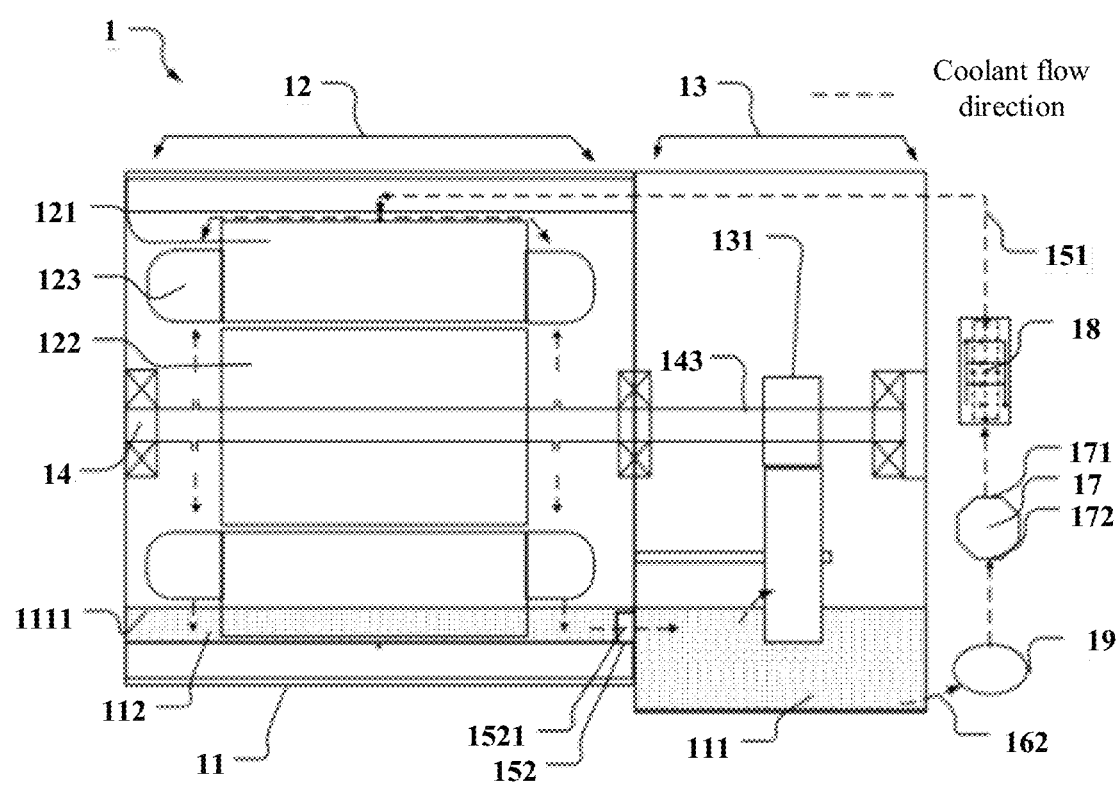
FIG. 3a is a schematic diagram of a structure of a powertrain according to an embodiment of this disclosure.

In another embodiment, for a specific structure of the powertrain 1 provided in this disclosure, refer to FIG. 3a. FIG. 3a is a schematic diagram of a structure of a powertrain according to an embodiment of this disclosure. The powertrain 1 includes a housing 11, and a motor 12, a retarder 13, and a rotating shaft 14 that are disposed in the housing 11. The rotating shaft 14 is connected to the motor 12 and the retarder 13 in a transmission manner.

As shown in FIG. 3a, for a related part of the motor 12, refer to the foregoing related description of FIG. 2a. As shown in FIG. 3a, for a related part of the retarder 13, refer to the foregoing related description of FIG. 2a.

As shown in FIG. 3a, the powertrain 1 further includes an oil pump system. The oil pump system may include a heat exchanger 18 and a filter 19. For details about the heat exchanger 18 and the filter 19, refer to the foregoing related description of FIG. 2a.

The oil pump system includes an oil pump 17, and the oil pump includes a first end 171 and a second end 172. For descriptions of the first end 171 and the second end 172, refer to the foregoing related description of FIG. 2a.

As shown in FIG. 3a, the oil pump 17 may communicate with the motor 12 through a first passage to transfer coolant to the motor 12 for cooling components in the motor 12. In an embodiment, the motor 12 may be provided with an oil inlet, and the oil inlet of the motor 12 communicates with the first end of the oil pump 17 through the first passage. In an embodiment, when the oil pump system drives the coolant to spray the stator iron core 121, the coolant flows on the surface of the stator iron core 121, and flows to the end winding 123, to dissipate heat for the stator iron core 121 and the end winding 123.

In an embodiment, the first end of the oil pump 17 may further communicate with the retarder 13 to transfer the coolant to the retarder 13 for cooling components in the retarder 13. In an embodiment, the retarder 13 may be provided with an oil inlet, and the oil inlet of the retarder 13 communicates with the first end of the oil pump 17 through a fifth passage.

It should be noted that, unlike FIG. 2a, in the structure shown in FIG. 3a, the first end of the oil pump 17 no longer communicates with a second oil sump 111 of the retarder 13.

As shown in FIG. 3a, the second end of the oil pump 17 may communicate with the second oil sump 111 of the retarder 13, so that the coolant in the second oil sump 111 may be transferred to the oil pump when the motor is rotating and output again through the first end 171, so as to flow into the motor 12 and the retarder 13 again for cooling the components in the motor 12 and the retarder 13. In an embodiment, the second oil sump 111 communicates with the second end 172 of the oil pump 17 through a fourth passage 162.

It should be noted that, unlike FIG. 2a, in the structure shown in FIG. 3a, a second valve 1621 is not disposed in the fourth passage 162. When the oil pump is rotating, the coolant in the second oil sump 111 is sucked into the oil pump 17.

In an embodiment, the first oil sump is not directly connected to the oil pump. As shown in FIG. 3a, the first oil sump 112 may communicate with the second oil sump 111, and the second oil sump communicates with the second end 172 of the oil pump 17. Therefore, the coolant inside the first oil sump 112 needs to pass through the second oil sump 111 before flowing into the oil pump 17. This case may be alternatively described as follows: The second end of the oil pump may communicate with the first oil sump of the motor, so that when the motor is rotating, the coolant in the first oil sump may be transferred to the oil pump and output again through the first end of the oil pump, so as to flow into the motor and the retarder again for cooling the components in the motor and the retarder.

In an embodiment, the first oil sump 112 may communicate with the second oil sump 111 through a second passage 152 with a first switch 1521. In an embodiment, an outlet of the first oil sump 112 may be connected to an inlet of the second oil sump 111, and a first switch 1521 is disposed at the outlet of the first oil sump 112.

In this embodiment of this disclosure, the first switch may have an open state (the open state may also be referred to as a fully open state) and a non-open state. When the first switch is in a non-open state, in an embodiment, the first switch is in a closed state (the closed state may also be referred to as a fully closed state), or in another embodiment, the first switch is in a non-open and non-closed state. This state may also be referred to as a half-open state or a half-closed state, and this state is a state other than the fully open state and the fully closed state.

When the first switch is in an open state, the second passage is open. To be specific, as the oil pump rotates, the coolant in the first oil sump may be transferred to the oil pump through the second passage.

When the first switch is in a closed state, the second passage is closed. To be specific, as the oil pump rotates, the coolant in the first oil sump cannot be transferred to the oil pump through the second passage.

When the first switch is in a non-open and non-closed state, the second passage is open, but compared with the first switch in the open state, the first switch in this case has a relatively small opening.

As shown in FIG. 3a, when the first switch 1521 is in an open state, and when the oil pump is rotating, the coolant in the first oil sump 112 may flow into the second oil sump 111 through the open first switch 1521, and further into the oil pump 17. Then heat is transferred to the battery pack through the heat exchanger 18 to heat the battery pack. It should be noted that the second passage may be a passage through which the coolant flows from the first oil sump 112 into the second oil sump 111. As shown in FIG. 3a, because the first switch 1521 is in an open state, the motor cavity communicates with the retarder cavity in this case. In an embodiment, when the first switch is in an open state, a horizontal plane of coolant in the motor cavity may be basically at the same height as a horizontal plane of coolant in the retarder cavity. In an embodiment, when the first switch is in an open state, a height difference between a horizontal plane of coolant in the motor cavity and a horizontal plane of coolant in the retarder is less than a second height difference threshold.

Figure 3B:
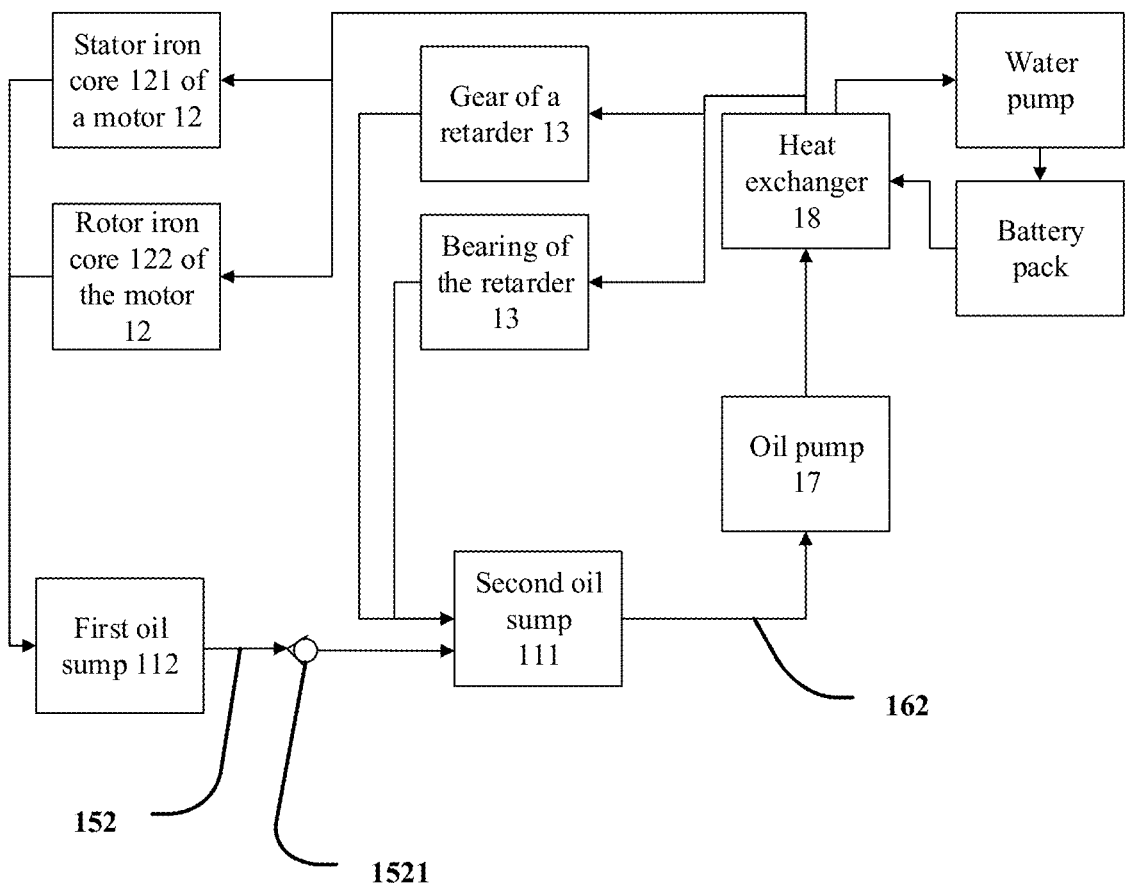

FIG. 3b shows an example of a logical architecture diagram of the structure of FIG. 3a based on the structure shown in FIG. 3a. As shown in FIG. 3b, the first oil sump 112 is connected to the second oil sump 111 through the second passage 152. A first switch 1521 is disposed on the second passage 152. The second oil sump 111 is connected to the oil pump 17 through the fourth passage 162. The oil pump 17 is connected to the heat exchanger 18. Heat on the coolant flowing from the oil pump 17 into the heat exchanger 18 may be transferred through the heat exchanger 18 to a water pump and further to a battery pack. In addition, the coolant flowing from the oil pump 17 into the heat exchanger 18 may be transferred again to the motor and the retarder for cooling the motor and the retarder. FIG. 3b shows an example of a possible schematic diagram of coolant flowing into the motor and the retarder. As shown in FIG. 3b, coolant output from the heat exchanger 18 may be transferred to the stator iron core 121 of the motor 12 and the rotor iron core 122 of the motor 12 for cooling the stator iron core 121 and the rotor iron core 122. FIG. 3b shows an example of a possible schematic diagram of coolant flowing into the motor and the retarder. As shown in FIG. 3b, coolant output from the heat exchanger 18 may be transferred to a gear of the retarder 13 and a bearing of the retarder 13 for cooling the gear and the bearing of the retarder 13.

Figure 3C:
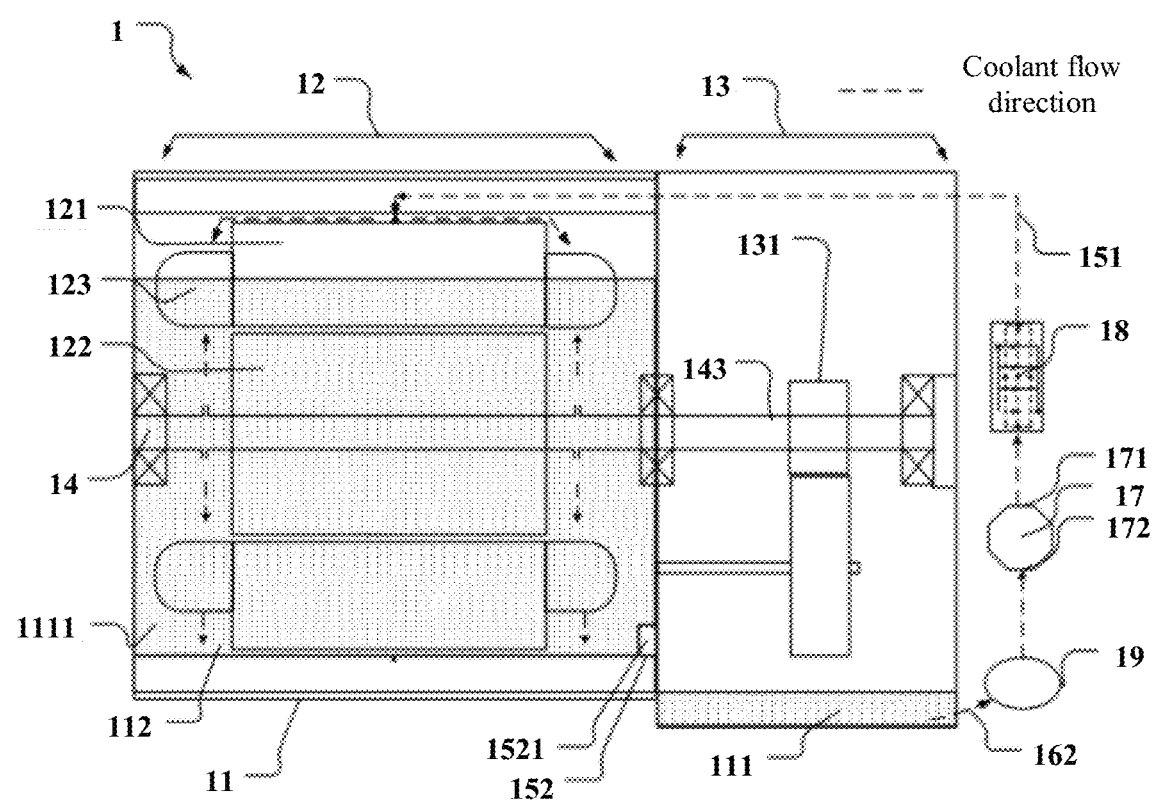
FIG. 3c is a schematic diagram of a coolant flow path in the structure shown in FIG. 3a when a first switch 1521 is closed.

FIG. 3c shows an example of a schematic diagram of a flow path of the coolant in the structure shown in FIG. 3a when the first switch 1521 is in a closed state. The structure of FIG. 3a is the same as the structure of FIG. 3c except that FIG. 3a is a schematic diagram of a flow path of the coolant when the first switch 1521 is in an open state. As shown in FIG. 3c, when the first switch 1521 is in a closed state, it may be understood that the motor cavity is a semi-closed cavity, and an opening area of the motor cavity is an oil inlet of the motor. In this case, the coolant in the first oil sump 112 cannot flow into the second oil sump 111. Therefore, when the oil pump is rotating, the coolant flows into the motor cavity from the oil inlet of the motor 12, but cannot flow out of the motor cavity, and accumulates in the motor cavity. When the coolant in the motor cavity immerses the motor components, the motor components can be cooled more effectively. As shown in FIG. 3c, because the first switch 1521 is in a closed state, the motor cavity does not communicate with the retarder cavity in this case. In an embodiment, when the first switch is in a closed state, a horizontal plane of coolant in the motor cavity may not be at the same height as a horizontal plane of coolant in the retarder cavity. As shown in FIG. 3c, the horizontal plane of the coolant in the motor cavity may be higher than the horizontal plane of the coolant in the retarder cavity. As the oil pump rotates, the horizontal plane of the coolant in the motor cavity can be higher and the horizontal plane of the coolant in the retarder cavity can be lower. In an embodiment, when the first switch is in a non-open state, a height difference between a horizontal plane of coolant in the motor cavity and a horizontal plane of coolant in the retarder is greater than a third height difference threshold.

Figure 3D:
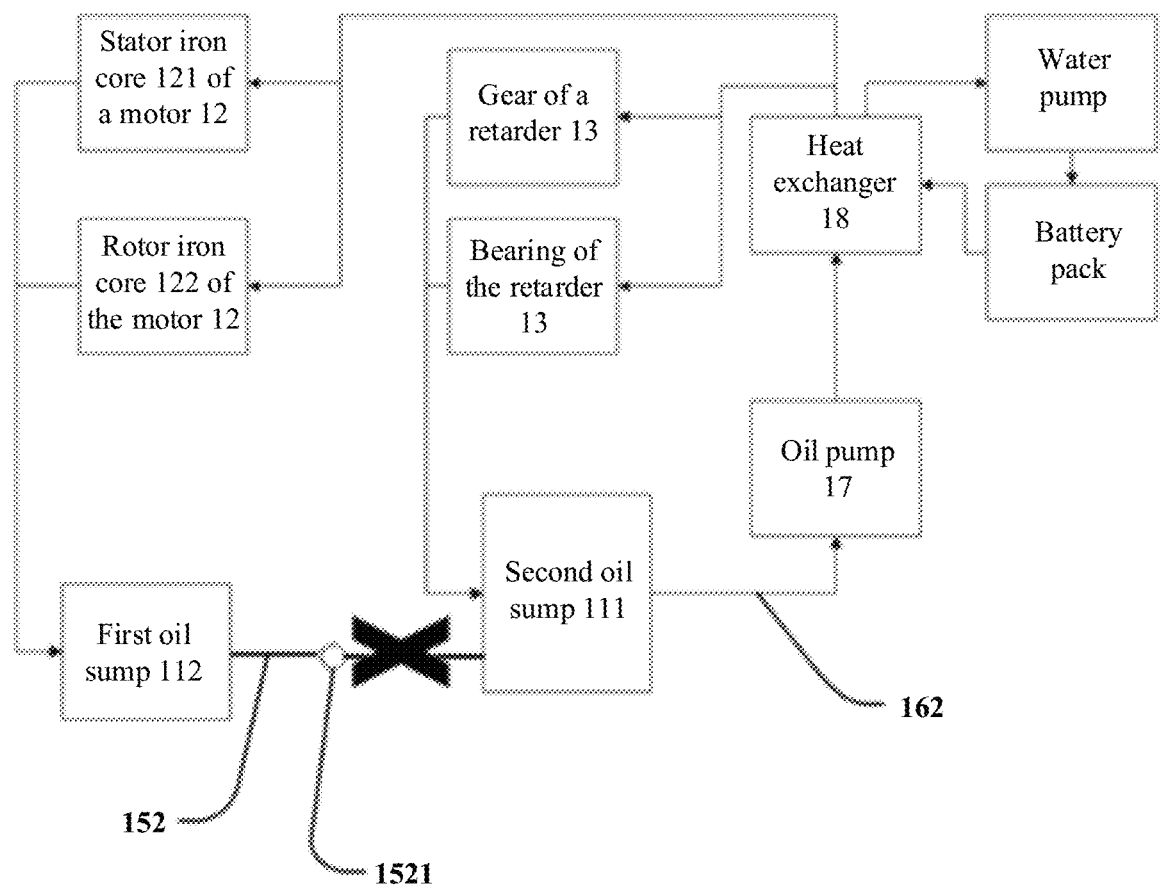
FIG. 3d is a logical architecture diagram of the structure of FIG. 3c.

FIG. 3d shows an example of a logical architecture diagram of the structure of FIG. 3c based on the structure shown in FIG. 3c. As shown in FIG. 3d, the first oil sump 112 is connected to the second oil sump 111 through the second passage 152. A first switch 1521 is disposed on the second passage 152. When the first switch 1521 is closed, it may be understood that the second passage is closed. The second oil sump 111 is connected to the oil pump 17 through the fourth passage 162. The oil pump 17 is connected to the heat exchanger 18. Heat on the coolant flowing from the oil pump 17 into the heat exchanger 18 may be transferred through the heat exchanger 18 to a water pump and further to a battery pack. In addition, the coolant flowing from the oil pump 17 into the heat exchanger 18 may be transferred again to the motor and the retarder for cooling the motor and the retarder. FIG. 3b shows an example of a possible schematic diagram of coolant flowing into the motor and the retarder. As shown in FIG. 3b, coolant output from the heat exchanger 18 may be transferred to the stator iron core 121 of the motor 12 and the rotor iron core 122 of the motor 12 for cooling the stator iron core 121 and the rotor iron core 122. When the first switch 1521 is closed, the coolant may accumulate in the motor cavity to immerse the rotor iron core 122, so that the coolant can cool the rotor iron core 122.

Figure 3E:
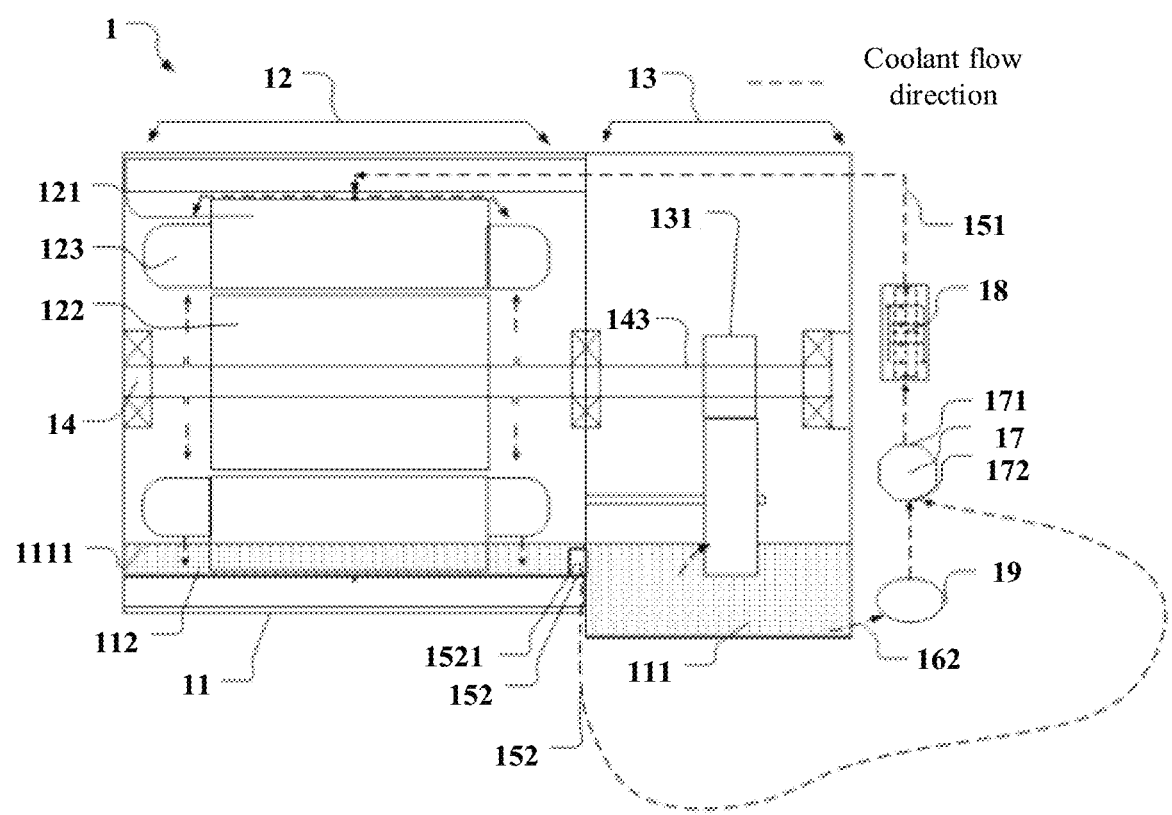
FIG. 3e is a schematic diagram of a structure of a powertrain according to an embodiment of this disclosure.

It should be noted that, in an embodiment, the first switch may not be fully closed, but may be in a semi-closed state, or may be in a non-open and non-closed state. In this case, the first switch may be partially closed, but a small amount of coolant may still flow out of the motor cavity. In this case, in an embodiment, when the oil pump is rotating, the coolant flows into the motor cavity from the oil inlet of the motor 12, but only a small amount of coolant may flow out of the motor cavity, so that the coolant accumulates in the motor cavity. When the motor components are immersed by the coolant in the motor cavity, the motor components can be cooled more effectively. In an embodiment, when the first switch is in a non-open state (for example, in a closed or semi-closed state), a height difference between a horizontal plane of coolant in the motor cavity and a horizontal plane of coolant in the retarder is greater than a third height difference threshold. FIG. 3e shows an example of a schematic diagram of another possible structure of the powertrain 1. FIG. 3e differs from FIG. 3a in that the first oil sump 112 communicates with the second end 172 of the oil pump 17, and the first oil sump 112 no longer communicates with the second oil sump 111. The second oil sump communicates with the second end 172 of the oil pump 17. In other words, unlike in FIG. 3a, the coolant in the first oil sump 112 may flow directly into the oil pump 17, and does not need to flow into the second oil sump 111. As shown in FIG. 3e, the first oil sump 112 may communicate with the second oil sump 111 through a second passage 152 with a first switch 1521. The second passage 152 does not pass through the second oil sump 111. The first switch may be disposed at a part far away from the motor, or may be disposed on the motor, for example, may be disposed at an outlet of the first oil sump 112. In this embodiment of this disclosure, a passage through which the coolant flows out of the second oil sump 111 of the motor 12 and flows into the second end 172 of the oil pump 17 may be referred to as the second passage. In an embodiment, the second passage may include a plurality of parts, for example, may include a part on the motor, and may further include a part between the motor and the oil pump through which coolant flows.

When the first switch 1521 is in an open state and the oil pump is rotating, the coolant in the first oil sump 112 may flow into the oil pump 17 through the open first switch 1521, and the oil pump 17 may obtain the coolant from the second oil sump 111 of the retarder 13. The coolant output by the oil pump 17 through the first end 171 passes through the heat exchanger 18, so that heat carried by the coolant from the motor and the retarder can be transferred to the battery pack for heating the battery pack. It should be noted that the second passage may be a passage through which the coolant flows from the first oil sump 112 into the oil pump 17.

For descriptions of other components in FIG. 3e, refer to related descriptions in FIG. 3a. Details are not described herein again.

Figure 3F:
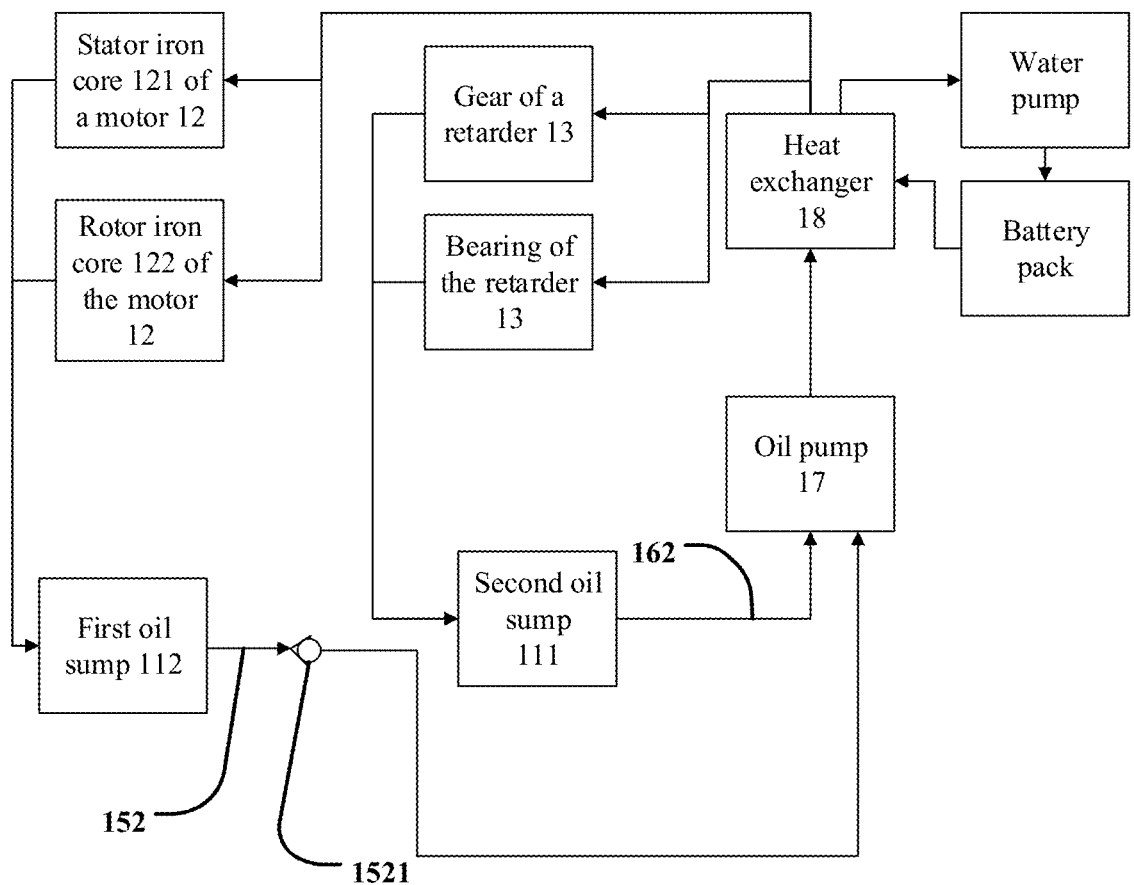
FIG. 3f is a logical architecture diagram of the structure of FIG. 3e.

FIG. 3f shows an example of a logical architecture diagram of the structure of FIG. 3e based on the structure shown in FIG. 3e. As shown in FIG. 3f, the first oil sump 112 is connected to the oil pump 17 through the second passage 152. FIG. 3e differs from FIG. 3b in that there is no communication between the first oil sump 112 and the second oil sump 111. A first switch 1521 is disposed on the second passage 152. The second oil sump 111 is connected to the oil pump 17 through the fourth passage 162. The oil pump 17 is connected to the heat exchanger 18. Heat on the coolant flowing from the oil pump 17 into the heat exchanger 18 may be transferred through the heat exchanger 18 to a water pump and further to a battery pack. In addition, the coolant flowing from the oil pump 17 into the heat exchanger 18 may be transferred again to the motor and the retarder for cooling the motor and the retarder. FIG. 3f shows an example of a possible schematic diagram of coolant flowing into the motor and the retarder. As shown in FIG. 3f, coolant output from the heat exchanger 18 may be transferred to the stator iron core 121 of the motor 12 and the rotor iron core 122 of the motor 12 for cooling the stator iron core 121 and the rotor iron core 122. FIG. 3f shows an example of a possible schematic diagram of coolant flowing into the motor and the retarder. As shown in FIG. 3f, coolant output from the heat exchanger 18 may be transferred to a gear of the retarder 13 and a bearing of the retarder 13 for cooling the gear and the bearing of the retarder 13.

Figure 3G:
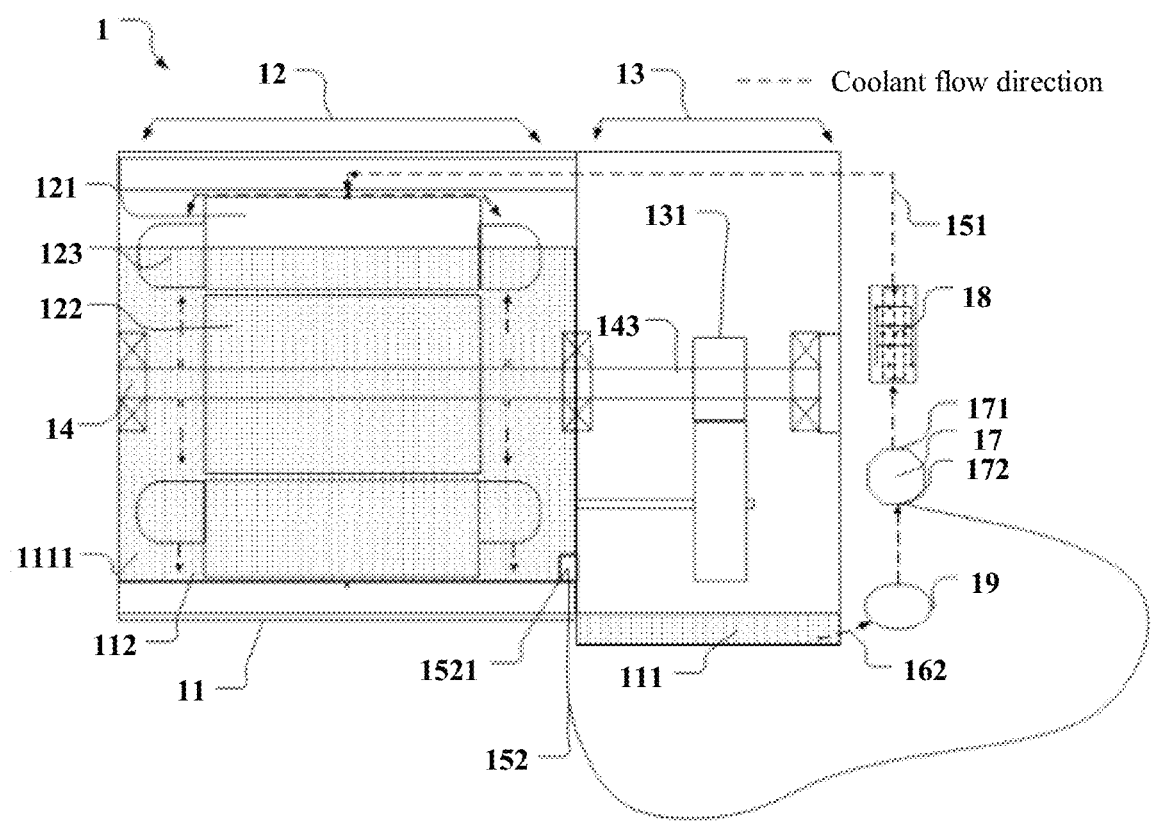
FIG. 3g is a schematic diagram of a structure of a powertrain according to an embodiment of this disclosure.

FIG. 3g shows an example of a schematic diagram of a flow path of the coolant in the structure shown in FIG. 3e when the first switch 1521 is in a closed state. The structure of FIG. 3g is the same as the structure of FIG. 3e except that FIG. 3e is a schematic diagram of a flow path of the coolant when the first switch 1521 is in an open state. As shown in FIG. 3g, when the first switch 1521 is in a closed state, it may be understood that the motor cavity is a semi-closed cavity, and an opening area of the motor cavity is an oil inlet of the motor. In this case, the coolant in the first oil sump 112 cannot flow into the oil pump 17. Therefore, when the oil pump is rotating, the oil pump 17 may obtain the coolant from the second oil sump 111 of the retarder 13, and further transfer the coolant into the motor cavity through the oil inlet of the motor 12. However, the coolant cannot flow out of the motor cavity, and therefore, the coolant accumulates in the motor cavity. When the coolant in the motor cavity immerses the motor components, the motor components can be cooled more effectively.

Figure 3H:
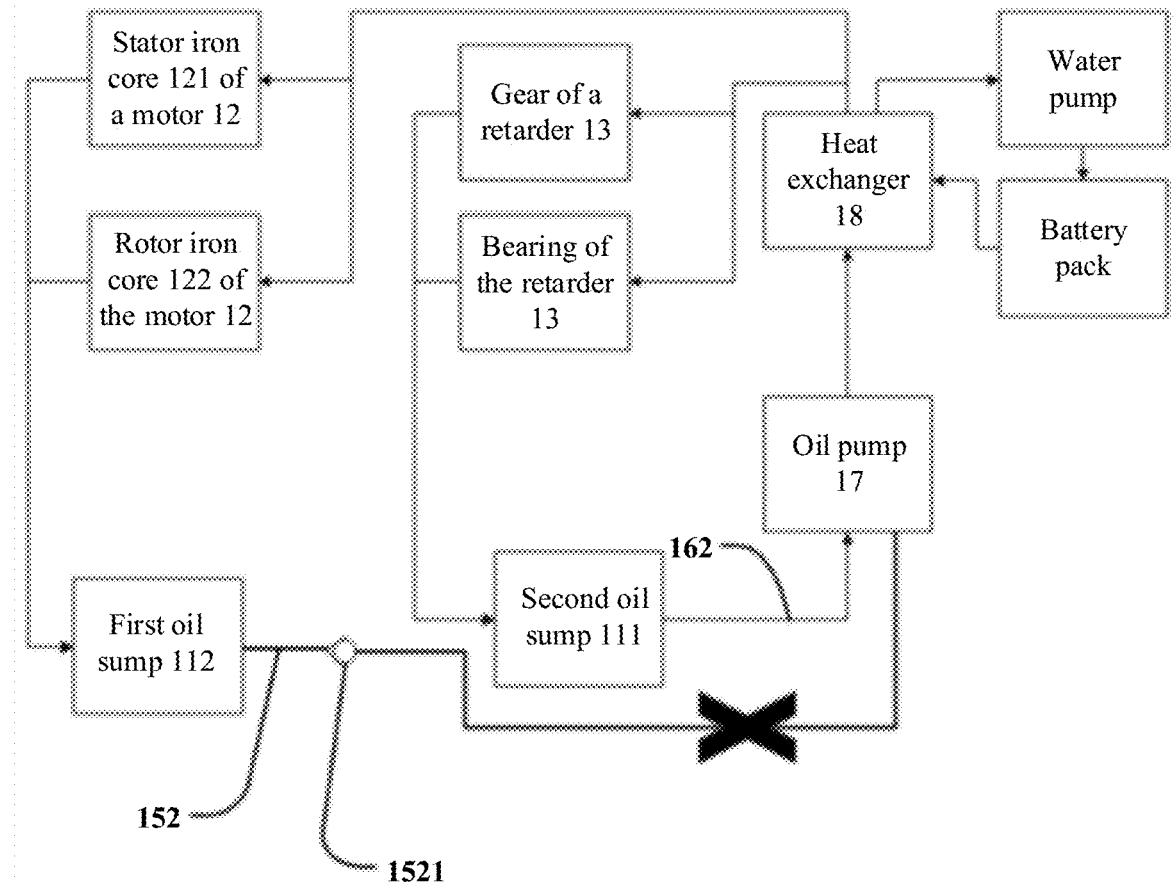
FIG. 3h is a logical architecture diagram of the structure of FIG. 3g.

FIG. 3h shows an example of a logical architecture diagram of the structure of FIG. 3g based on the structure shown in FIG. 3g. As shown in FIG. 3h, the first oil sump 112 is connected to the oil pump 17 through the second passage 152. A first switch 1521 is disposed on the second passage 152. When the first switch 1521 is closed, it may be understood that the second passage is closed. The second oil sump 111 is connected to the oil pump 17 through the fourth passage 162. The oil pump 17 is connected to the heat exchanger 18. Heat on the coolant flowing from the oil pump 17 into the heat exchanger 18 may be transferred through the heat exchanger 18 to a water pump and further to a battery pack. In addition, the coolant flowing from the oil pump 17 into the heat exchanger 18 may be transferred again to the motor and the retarder for cooling the motor and the retarder. FIG. 3f shows an example of a possible schematic diagram of coolant flowing into the motor and the retarder. As shown in FIG. 3f, coolant output from the heat exchanger 18 may be transferred to the stator iron core 121 of the motor 12 and the rotor iron core 122 of the motor 12 for cooling the stator iron core 121 and the rotor iron core 122. When the first switch 1521 is closed, the coolant may accumulate in the motor cavity to immerse the rotor iron core 122, so that the coolant can cool the rotor iron core 122.

With reference to the structures provided in FIG. 3a and FIG. 3e, the following further describes embodiments of this disclosure.

As shown in FIG. 3a and FIG. 3e, in an embodiment, the powertrain further includes a first control member. The first control member is connected to the first switch. The first control member is configured to control an on/off operation of the first switch 1521 based on a rotational speed of the motor. In an embodiment, the first switch is a one-way valve. In another embodiment, the first switch may be an electromagnetic valve. In an embodiment, the first control member is a third controller. In this way, the third controller may control the on/off operation of the first switch.

Under the structures shown in FIG. 3a and FIG. 3e, there are a plurality of solutions in which the third controller controls the first switch 1521. The following describes solutions b1 and b2 as examples.

Solution b1.

In an embodiment, the first switch is controlled to be in a non-open state when a first condition is met. The first switch is controlled to be in an open state when a second condition is met.

In an embodiment, the first condition may be understood as a trigger condition. When the first switch is in an open state, if the first condition is met, the first switch is controlled to be in a non-open state. When the first switch is in a non-open state, if the second condition is met, the first switch is controlled to be in an open state.

In an embodiment, when the first switch is in a non-open state, if an amount of coolant flowing from the oil inlet of the motor is greater than an amount of coolant flowing out of the motor (for example, the coolant may flow from a valve in a semi-closed state), the coolant still accumulates in the motor cavity to immerse and cool the motor components in an immersion manner, thereby improving a cooling effect.

The first condition may include any one of the conditions a1 to a7, or may include any combination of the conditions a1 to a7. The second condition may include any one of the conditions b1 to b8, or may include any combination of the conditions b1 to b8. For details herein, refer to related content of the first condition and the second condition in the foregoing descriptions.

It should be noted that there is no necessary correspondence between the first condition and the second condition. For example, if the first condition includes at least the condition a1, the second condition may include the condition b1, or may not include the condition b1. There are a plurality of options available for the first condition, and there are also a plurality of options available for the second condition. Several examples are provided below.

In an embodiment, the first condition includes the condition a1, and the second condition includes the condition b1. An application scenario of this possible implementation is as follows: When the motor stops rotating or rotates at a low speed, for example, lower than the first rotational speed threshold, and the temperature of the battery pack is relatively low, for example, lower than the first battery pack temperature threshold, heat generated by the powertrain needs to be transferred to the battery pack to heat the battery pack. In this disclosure scenario, the motor may be energized by using the second controller, and motor components (such as a rotor iron core) generate heat. In this case, the oil pump may rotate first by turning on the first switch, so that the coolant brings heat generated by the motor components to the battery pack to heat the battery pack. In this disclosure scenario, further, when the first condition is met, the first switch may be triggered to be in a non-open state, for example, in a closed state, so that the coolant accumulates in the motor to immerse and cool motor components (such as a rotor iron core). In addition, when the second condition is met, for example, when the condition b1 is met, or the temperature of the motor is relatively low, or the motor has been effectively cooled in an immersion manner, the coolant may flow out of the motor cavity, so as to transfer heat to the battery pack through the heat exchanger.

Solution b2.

In an embodiment, when a first condition is met, the following is periodically performed: keeping the first switch open for fifth preset duration, and keeping the first switch closed for sixth preset duration.

In the solution b2, when the first condition is met, the first switch may first be turned on for the fifth preset duration, then the first switch may be turned off for the sixth preset duration, then the first switch may be turned on for the fifth preset duration, then the first switch may be turned off for the sixth preset duration, and so on.

In another embodiment, when the first condition is met, the first switch may first be turned off for the sixth preset duration, then the first switch may be turned on for the fifth preset duration, then the first switch may be turned off for the sixth preset duration, then the first switch may be turned on for the fifth preset duration, and so on.

In the solution b2, the fifth preset duration and the sixth preset duration may be separately set, and the fifth preset duration and the sixth preset duration may be equal or unequal. In an embodiment, the sixth preset duration may be determined based on duration from a time when the first switch is turned off to a time when the motor cavity is filled with oil. The sixth preset duration at least meets a condition that after the first switch is closed for the sixth preset duration, the coolant in the motor cavity reaches the preset coolant capacity threshold. In other words, after the first switch is closed for the sixth preset duration, the coolant in the motor cavity immerses the motor components. In this way, the motor components can be immersed and cooled, thereby improving a cooling effect.

In another embodiment, a second controller is further included. The second controller is configured to: start to stall the motor, or rotate the motor at a speed less than a third rotational speed threshold when a temperature of the battery pack is less than a preset third battery pack temperature threshold and the battery pack needs to be charged or discharged. In this scenario, when the motor is energized, the first switch may be in an open state, and then in subsequent operations, the on/off operation of the first switch may be controlled by using the solution b1 or b2.

In another embodiment, a direct current is supplied to the motor when the temperature of the battery pack is less than the preset third battery pack temperature threshold and the battery pack needs to be charged or discharged. In this way, the motor may rotate at a speed less than the third rotational speed threshold.

In another embodiment, an alternating current is supplied to the motor when the temperature of the battery pack is less than the preset third battery pack temperature threshold and the battery pack needs to be charged or discharged. In this case, the motor may be a permanent magnet synchronous motor or the like. In this way, the motor may rotate at a speed less than the third rotational speed threshold. In an embodiment, when an alternating current is supplied to the motor, an eddy current loss may be caused on silicon steel sheets of the stator and rotor iron cores and a magnet steel of the rotor iron core, thereby increasing the total heat amount generated by the motor. This disclosure scenario may further increase the heat generated by the powertrain. However, in this disclosure scenario, the oil coolant cannot flow effectively in the rotor iron core due to the suspension or low speed rotation of the rotor iron core of the motor, and if the external environment is relatively low, the viscosity of the coolant is relatively high in the low temperature scenario. In this case, it is difficult for the oil pump to drive the coolant to circulate normally in the powertrain, and the motor has a relatively poor cooling effect. Basically no cooling of the rotor iron core causes the temperature of the magnet steel of the rotor iron core to rise continuously, and a phenomenon of over-temperature and magnetic loss may occur. In view of this, in the solution provided in this embodiment of this disclosure, the motor components are immersed in the coolant by turning off the first switch, achieving better heat dissipation for the motor components.

In another embodiment, a third controller is further included, and the third controller is connected to the motor. The third controller is configured to: start a derating protection operation for the motor when the temperature of the motor is greater than a third temperature threshold in a case in which the first switch is in a non-open state. When the first switch is closed, the coolant accumulates in the motor cavity to reduce the temperature of the rotor iron core of the motor. However, after a period of time, the temperature of the motor may rise again after reduction because the coolant accumulates in the motor cavity and does not flow. In this case, in an embodiment, the derating protection operation may be started. For related descriptions of the derating protection, refer to the foregoing descriptions. Details are not described herein again.

In FIG. 3a and FIG. 3e, the first switch 1521 is disposed on the second passage 152. As mentioned above, the first switch 1521 may be controlled by the third controller. In addition, on/off of the first switch 1521 may be alternatively controlled by using a structural member.

In an embodiment, the first control member is connected to the retarder. The first control member controls an on/off operation of the first switch based on a rotational speed of the retarder. In an embodiment, an opening degree of the first switch is related to a rotational speed of the retarder.

In an embodiment, at least one of the following is further included:
  the first switch is in an open state when a rotational speed of a gear of the retarder is not less than a fourth rotational speed threshold;
  when the rotational speed of the gear of the retarder is less than the fourth rotational speed threshold, the first switch is in a semi-closed state and a lower rotational speed of the gear of the retarder leads to a larger opening of the first switch; or the first switch is in a closed state when the rotational speed of the gear of the retarder is less than a fifth rotational speed threshold, where the fifth rotational speed threshold is less than the fourth rotational speed threshold.

Figure 4A:
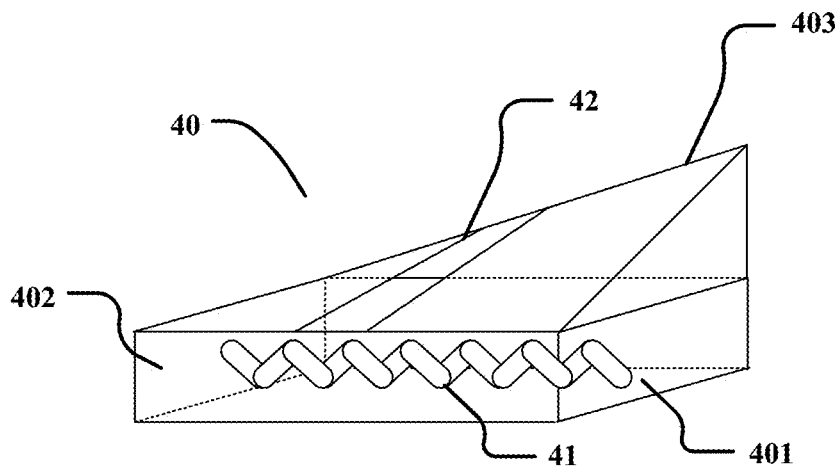
FIG. 4a is a schematic diagram of a structure of a first control member according to an embodiment of this disclosure.
Figure 4B:
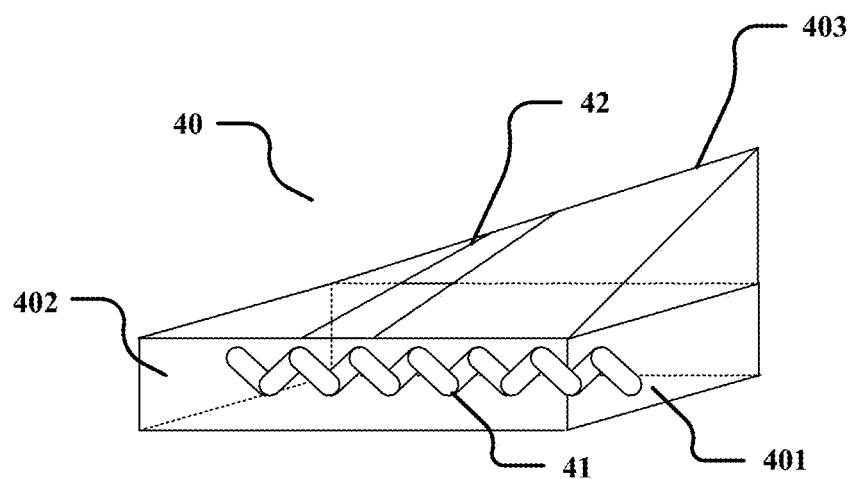
FIG. 4b is a schematic diagram of a structure in which a block 402 in FIG. 4a is in a middle position.
Figure 4C:
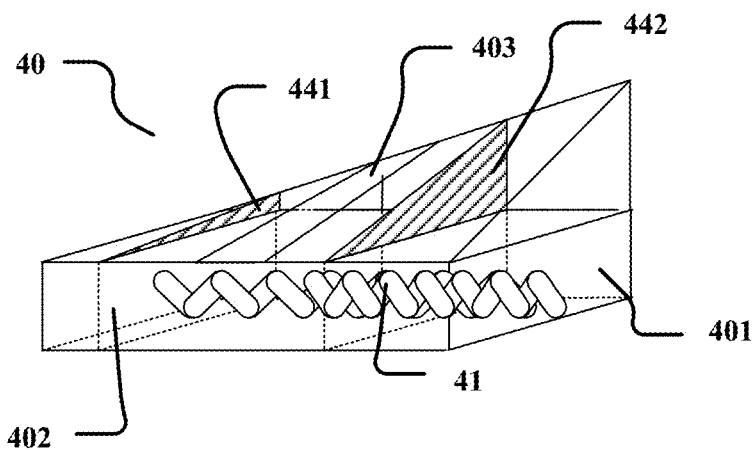
FIG. 4c is a schematic diagram of a structure including a gap between a block 402 and a top surface 403 when the block is in two different positions.
Figure 4D:
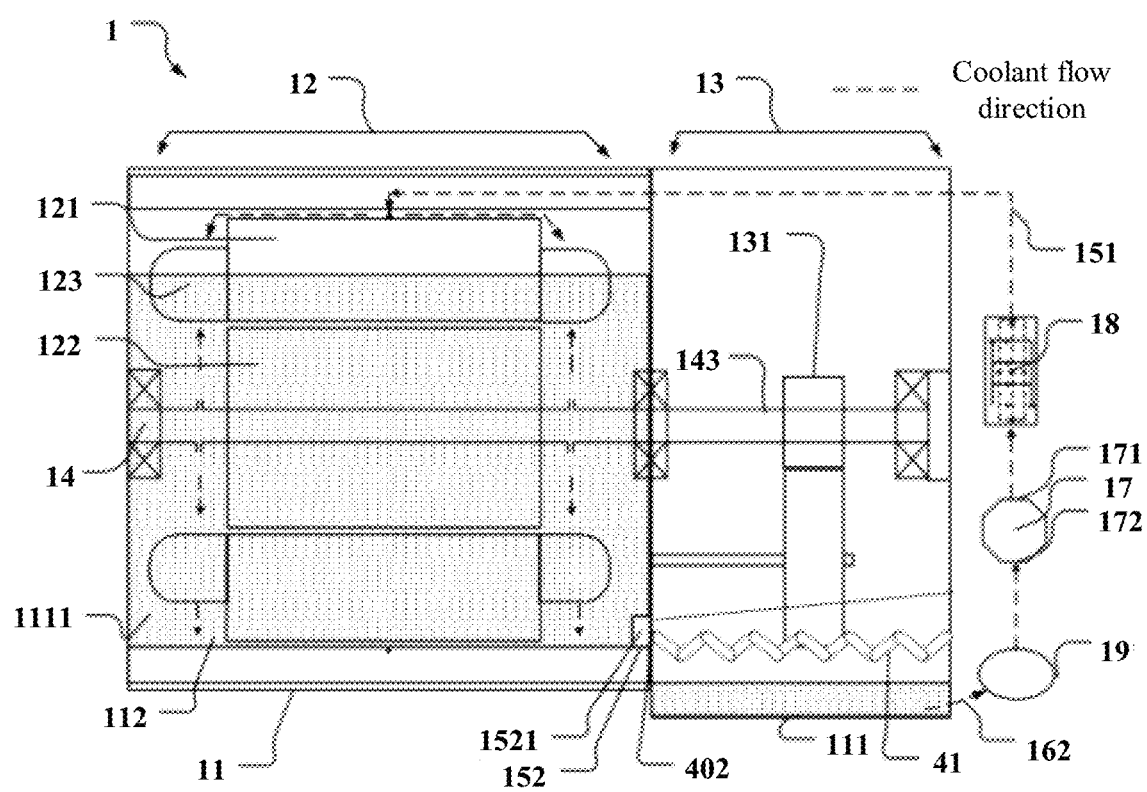
FIG. 4d is a schematic diagram of another structure of a powertrain according to an embodiment of this disclosure.

FIG. 4d to FIG. 4c show examples of schematic diagrams of a possible structure form of the first control member. The following describes the structure form with reference to FIG. 4d to FIG. 4c.

The following describes the structure form of the structure first by using FIG. 4a. As shown in FIG. 4a, the first control member may be a box-like structure, and the structure includes a left end surface that may be driven by a spring 41 to move in a reciprocating manner. The left end surface may be referred to as a block 402. The structure further includes a right end surface 401. As can be seen from FIG. 4a, an area of the right end surface 401 is greater than an area of the left end surface. A top surface 403 of the structure is an inclined surface. An opening is provided on the top surface 403 and may be referred to as a fourth opening 42. The gear of the retarder may extend into the structure through the fourth opening 42 so that when the gear rotates, coolant inside the structure can be carried away.

FIG. 4a is a schematic diagram of a structure in which the block is at the leftmost end. FIG. 4b shows an example of a schematic diagram of a structure in which the block 402 in FIG. 4a is in the middle position. As can be seen from FIG. 4b, when the block moves toward the right end surface 401, a gap between the block 402 and the top surface 403 is also increasing. FIG. 4c shows an example of a schematic diagram of a structure including a gap between the block 402 and the top surface 403 when the block is in two different positions. As shown in FIG. 4c, when a first gap 441 is compared with a second gap 442, an area of the second gap 442 is greater than an area of the first gap 441.

When the first control member 40 shown in FIG. 4a is disposed in a housing of the retarder, a corresponding structure is shown in FIG. 4d. The structure is disposed at the bottom of the case body of the retarder. An opening may be provided on the housing of the motor and, for example, may be referred to as a third opening. The opening may be blocked by a block 402. When the block 402 blocks the third opening, the third opening may be in a closed state. In this case, the coolant in the motor cavity cannot flow out through the third opening. However, when the block 402 does not block the third opening, the coolant in the motor cavity can flow out through the third opening. As shown in FIG. 4d, the block 402 may be connected by a spring 41. When the spring is retracted, the block 402 is driven to move away from the third opening. When the spring is stretched, the spring 41 is driven to move towards the third opening.

As shown in FIG. 4d, when the retarder rotates at a low speed, a small amount of coolant is carried by the retarder from the first control member 40. In this case, the pressure in the space on the right side of the block is relatively large, whereas the pressure in the space on the left side of the block is not increased, thereby causing the block to be subjected to a pressure difference under which the block moves towards the third opening along with the stretching of the spring. As the block moves to the left, a gap between the block and the top surface of the first control member 40 becomes smaller, and the coolant in the motor cavity can flow into the retarder cavity through a smaller gap. When the block completely blocks the third opening, the coolant in the motor cavity cannot flow out through the third opening.

Figure 4E:
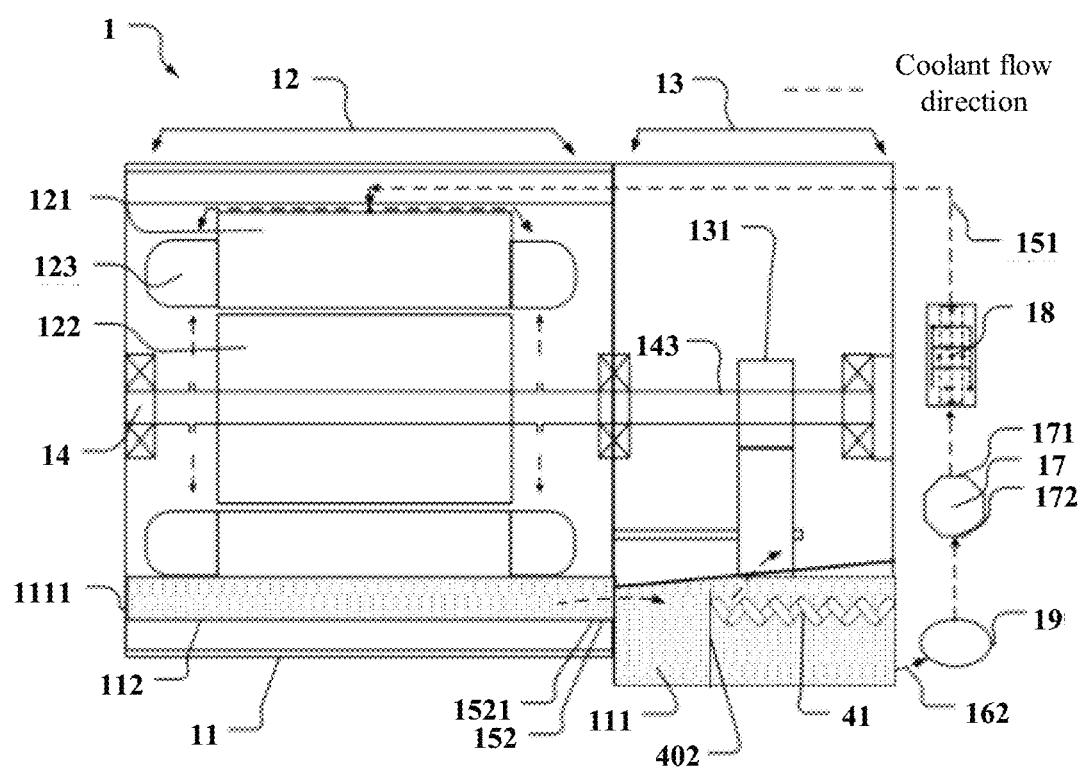
FIG. 4e is a schematic diagram of another structure of a powertrain according to an embodiment of this disclosure.

As shown in FIG. 4e, when the retarder rotates at a high speed, a large amount of coolant is carried by the retarder from the first control member 40. Due to the large amount of carried coolant, the pressure in the space on the right side of the block is relatively small, whereas the pressure in the space on the left side of the block is not decreased, thereby causing the block to be subjected to a pressure difference under which the block moves far away from the third opening along with the retraction of the spring. As the block moves to the right, a gap between the block and the top surface of the first control member 40 becomes larger, and the coolant in the motor cavity can flow into the retarder cavity through a larger gap.

Certainly, a person skilled in the art can make various modifications and variations to this disclosure without departing from the protection scope of this disclosure. This disclosure is intended to cover these modifications and variations of this disclosure provided that they fall within the scope of protection defined by the following claims and their equivalent technologies.

What is claimed is:

1. A powertrain, comprising:
an oil pump; and
a motor, wherein
the motor includes an oil inlet, and the oil inlet of the motor communicates with a first end of the oil pump through a first passage; based on the oil pump rotating, a port at the first end is an oil outlet of the oil pump; and based on the oil pump reversing, the port at the first end is an oil inlet of the oil pump;
the motor includes a first oil sump; the first oil sump communicates with a second end of the oil pump through a second passage; based on the oil pump rotating, a port at the second end is an oil inlet of the oil pump; and based on the oil pump reversing, the port at the second end is an oil outlet of the oil pump; and
the first end of the oil pump communicates with a second oil sump through a third passage with a first valve; and the second end of the oil pump communicates with the second oil sump through a fourth passage with a second valve.

2. The powertrain according to claim 1, wherein
based on the oil pump rotating, the second valve is in an open state, and the first valve is in a closed state; or
based on the oil pump reversing, the second valve is in a closed state and the first valve is in an open state.

3. The powertrain according to claim 1, wherein the second oil sump comprises a first opening and a second opening;
the second oil sump is connected to the fourth passage through the first opening, and the second oil sump is connected to the third passage through the second opening; and
a bottom of the first opening is higher than a bottom of the second opening.

4. The powertrain according to claim 1, further comprising a retarder, wherein
the retarder includes an oil inlet, and the oil inlet of the retarder communicates with the first end of the oil pump through a fifth passage; and
the second oil sump is an oil sump disposed on the retarder.

5. The powertrain according to claim 1, further comprising a first controller, wherein
the first controller is connected to the oil pump, and the first controller is configured to control the rotation or reversion of the oil pump.

6. The powertrain according to claim 5, wherein the first controller is configured to:
control the oil pump to reverse when a first condition is met; or
control the oil pump to rotate when a second condition is met, wherein
the first condition comprises at least one of the following:
a temperature of the motor is greater than a first temperature threshold;
a running time of the motor is greater than a first running time threshold;
a running time of the oil pump is greater than a second running time threshold;
a temperature of a battery pack is less than a first battery pack temperature threshold;
a rotational speed of the motor is less than a first rotational speed threshold;
an amount of coolant accumulating in a motor cavity is less than a first coolant capacity threshold; or
a height difference between a horizontal plane of coolant in the first oil sump and a horizontal plane of coolant in the second oil sump is not greater than a first height difference threshold; and
the second condition comprises at least one of the following:
the temperature of the motor is not greater than a second temperature threshold;
the running time of the motor is not greater than a third running time threshold;
the running time of the oil pump is not greater than a fourth running time threshold;
the temperature of the battery pack is not less than a second battery pack temperature threshold;
the rotational speed of the motor is not less than a second rotational speed threshold;
the amount of coolant accumulating in the motor cavity is not less than a second coolant capacity threshold;
a decrease amount of a current of the oil pump in second preset duration is greater than a current threshold; or
the height difference between the horizontal plane of the coolant in the first oil sump and the horizontal plane of the coolant in the second oil sump is greater than the first height difference threshold.

7. The powertrain according to claim 6, further comprising a sensor assembly, wherein
the sensor assembly is disposed on an inner wall of the motor cavity, and is configured to detect the amount of coolant accumulating in the motor cavity.

8. The powertrain according to claim 5, wherein the first controller is configured to:
based on a first condition being met, periodically perform the following:
rotating the oil pump for third preset duration, and reversing the oil pump for fourth preset duration, wherein
the first condition comprises at least one of the following:
a temperature of the motor is greater than a first temperature threshold;
a running time of the motor is greater than a first running time threshold;
a temperature of a battery pack is less than a first battery pack temperature threshold;
a rotational speed of the motor is less than a first rotational speed threshold; or
an amount of coolant accumulating in a motor cavity is less than a first coolant capacity threshold.

9. A powertrain, comprising:
a motor and a first control member, wherein
the motor includes an oil inlet; the oil inlet of the motor communicates with a first end of an oil pump through a first passage; based on the oil pump rotating, a port at the first end is an oil outlet of the oil pump;
the motor includes a first oil sump; the first oil sump communicates with a second end of the oil pump through a second passage with a first switch; based on the oil pump rotating, a port at the second end is an oil inlet of the oil pump;
the first control member is connected to the first switch; the first control member is configured to control an on/off operation of the first switch; and
the second end of the oil pump communicates with a second oil sump through a fourth passage.

10. The powertrain according to claim 9, wherein
based on the first switch being in an open state and the oil pump rotating, coolant flows into a motor cavity from the first end of the oil pump, and coolant collected in the first oil sump of the motor flows into the oil pump from the second end of the oil pump through the second passage; or
based on the first switch being in a closed state and the oil pump rotating, coolant flows into a motor cavity from the first end of the oil pump, and accumulates in the motor cavity.

11. The powertrain according to claim 9, further comprising a retarder, wherein
the retarder includes an oil inlet, and the oil inlet of the retarder communicates with the first end of the oil pump through a fifth passage; and
the second oil sump is an oil sump disposed on the retarder.

12. The powertrain according to claim 11, wherein one end of the second passage is connected to the first oil sump; and
the other end of the second passage is connected to the second oil sump.

13. The powertrain according to claim 11, wherein one end of the second passage is connected to the first oil sump; and
the other end of the second passage communicates with the second end of the oil pump, and the other end of the second passage is not connected to the second oil sump.

14. The powertrain according to claim 9, wherein the first switch is a one-way valve.

15. The powertrain according to claim 9, wherein the first control member is a third controller, and the third controller is configured to:
control the first switch to be in a closed state based on a first condition being met; or
control the first switch to be in an open state based on a second condition being met, wherein
the first condition comprises at least one of the following:
a temperature of the motor is greater than a first temperature threshold;
a running time of the motor is greater than a first running time threshold;
a temperature of a battery pack is less than a first battery pack temperature threshold;
a rotational speed of the motor is less than a first rotational speed threshold; or
an amount of coolant accumulating in the motor cavity is less than a first coolant capacity threshold; and
the second condition comprises at least one of the following:
a change in a rotational speed of the oil pump in first preset duration is less than a rotational speed change threshold, and a decrease amount of a current of the oil pump in second preset duration is greater than a current threshold;
the temperature of the motor is not greater than a second temperature threshold;
a running time of the oil pump is not greater than a second running time threshold;
the temperature of the battery pack is not less than a second battery pack temperature threshold;
the rotational speed of the motor is not less than a second rotational speed threshold; or
the amount of coolant accumulating in the motor cavity is not less than a second coolant capacity threshold.

16. The powertrain according to claim 15, further comprising a sensor assembly, wherein
the sensor assembly is disposed on an inner wall of the motor cavity, and is configured to detect the amount of coolant accumulating in the motor cavity.

17. The powertrain according to claim 9, wherein the first control member is a third controller, and the third controller is configured to:
based on a first condition being met, periodically perform the following:
keeping the first switch open for fifth preset duration, and keeping the first switch closed for sixth preset duration, wherein
the first condition comprises at least one of the following:
a temperature of the motor is greater than a first temperature threshold;
a running time of the motor is greater than a first running time threshold;
a temperature of a battery pack is less than a first battery pack temperature threshold;
a rotational speed of the motor is less than a first rotational speed threshold; or
an amount of coolant accumulating in the motor cavity is less than a first coolant capacity threshold.

18. The powertrain according to claim 9, wherein the first control member is connected to the retarder; and
the first control member controls an on/off operation of the first switch based on a rotational speed of the retarder.

19. The powertrain according to claim 18, wherein an opening degree of the first switch is related to the rotational speed of the retarder.

20. The powertrain according to claim 18, further comprising at least one of the following:
the first switch is in an open state based on a rotational speed of a gear of the retarder being not less than a fourth rotational speed threshold;
a lower rotational speed of the gear of the retarder leads to a larger opening of the first switch based on the rotational speed of the gear of the retarder being less than the fourth rotational speed threshold; or
the first switch is in a closed state based on the rotational speed of the gear of the retarder being less than a fifth rotational speed threshold, wherein the fifth rotational speed threshold being less than the fourth rotational speed threshold.

* * * * *